United States Patent
Kim et al.

(10) Patent No.: US 9,906,928 B2
(45) Date of Patent: Feb. 27, 2018

(54) MOBILE TERMINAL AND CONTROL METHOD THEREOF

(71) Applicant: LG ELECTRONICS INC., Seoul (KR)

(72) Inventors: Dongik Kim, Seoul (KR); Minseon Son, Seoul (KR); Namyoung Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 14/288,281

(22) Filed: May 27, 2014

(65) Prior Publication Data

US 2015/0119013 A1    Apr. 30, 2015

(30) Foreign Application Priority Data

Oct. 25, 2013 (KR) ........................ 10-2013-0127964

(51) Int. Cl.
*H04W 4/18* (2009.01)
*H04M 3/436* (2006.01)
*H04M 1/2745* (2006.01)
*H04M 1/57* (2006.01)

(52) U.S. Cl.
CPC ....... *H04W 4/18* (2013.01); *H04M 1/274508* (2013.01); *H04M 1/575* (2013.01); *H04M 3/436* (2013.01)

(58) Field of Classification Search
CPC ........... H04M 3/436; H04M 1/274508; H04M 1/274533; H04M 1/56; H04M 1/575; H04M 2203/558; H04M 3/42068; H04M 3/42059
See application file for complete search history.

(56) References Cited

U.S. PATENT DOCUMENTS

| | | | | |
|---|---|---|---|---|
| 2011/0287810 A1* | 11/2011 | Zelber | ................... | H04M 1/656 455/566 |
| 2012/0015639 A1* | 1/2012 | Trivi | ..................... | H04M 3/436 455/415 |
| 2014/0128047 A1* | 5/2014 | Edwards | ................. | H04L 51/12 455/415 |
| 2014/0219430 A1* | 8/2014 | Daniel | ................. | H04M 3/436 379/142.05 |

* cited by examiner

*Primary Examiner* — Nam Huynh
(74) *Attorney, Agent, or Firm* — Ked & Associates, LLP

(57) ABSTRACT

The present disclosure relates to a mobile terminal and methods for entering memo that is associated with a telephone number used in communication. A mobile terminal according to one embodiment of the present disclosure may include a display unit configured to display a record of communication with a telephone number that is not available in an address book of the mobile terminal; and a controller configured to activate a memo input mode to enter a memo associated with the telephone number when the record is selected, store a memo entered in association with the telephone number separately from the address book when the memo is entered through the memo input mode, wherein the controller controls the display unit to display the entered memo associated with the telephone number in response to a communication with the telephone number.

18 Claims, 15 Drawing Sheets

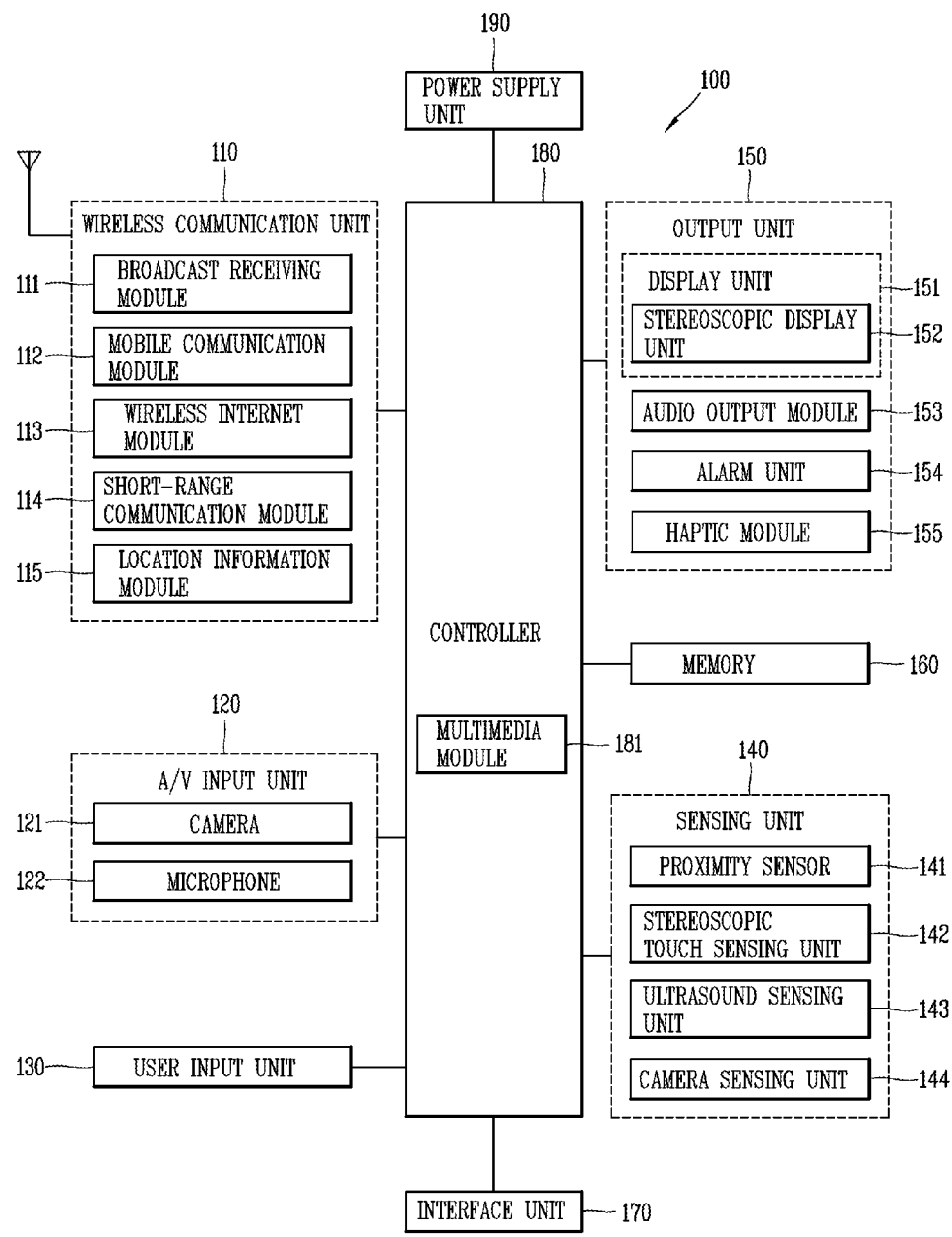

FIG. 12
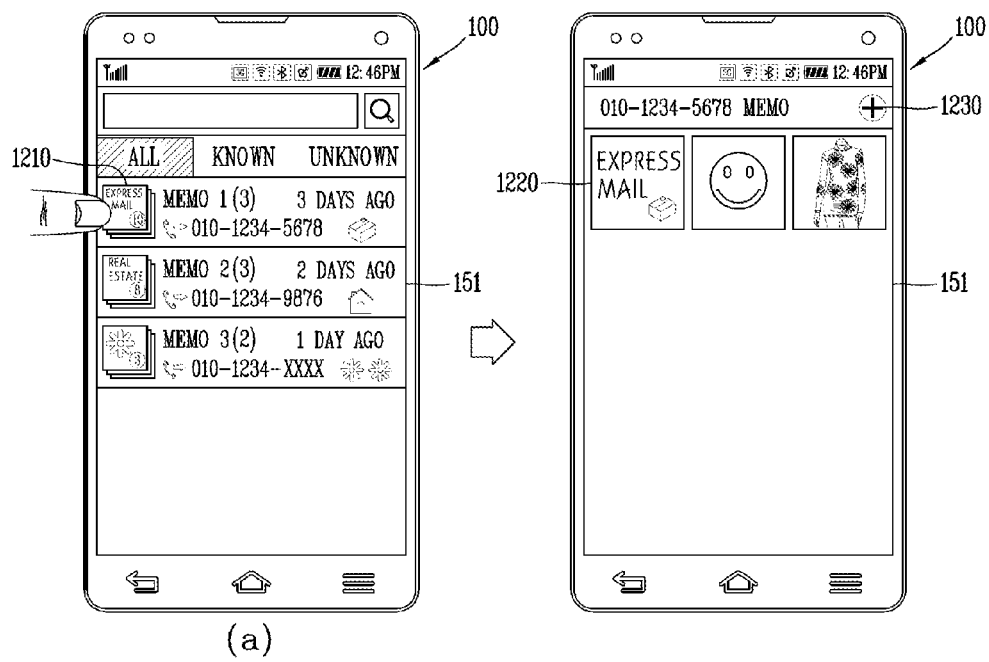
(a)
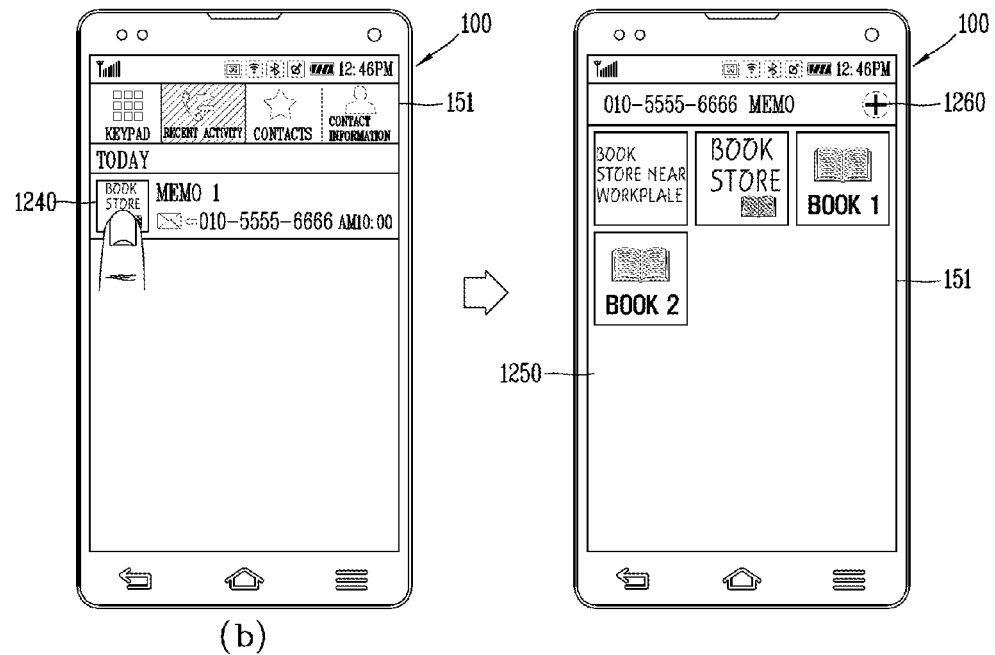
(b)

(a)   (b)

MOBILE TERMINAL AND CONTROL METHOD THEREOF

CROSS-REFERENCE TO RELATED APPLICATION

This application claims priority under 35 U.S.C. § 119 to Korean Patent Application No. 10-2013-0127964, filed on Oct. 25, 2013, whose entire disclosure is hereby incorporated by reference.

BACKGROUND

1. Field

The present disclosure relates to a mobile terminal, and more particularly, to a mobile terminal capable of receiving input information, such as a phone number that has already been used, and a control method thereof.

2. Background

Terminals can be classified into two types, such as a mobile or portable terminal and a stationary terminal based on its mobility. Furthermore, the mobile terminal can be further classified into two types, such as a handheld terminal and a vehicle mount terminal based on whether or not it can be directly carried by a user.

As it becomes multifunctional, for example, such a terminal is allowed to capture still images or moving images, play music or video files, play games, receive broadcast and the like, so as to be implemented as an integrated multimedia player. Moreover, the improvement of structural or software elements of the terminal may be taken into consideration to support and enhance the functions of the terminal.

In the wave of communication innovation, a messenger, such as social networking service (SNS), is automatically allowed to access to the numbers stored in an address book of a mobile terminal. In this regard, particular phone numbers that a user does not want to be linked to the messenger may be automatically stored in the SNS. For instance, particular phone numbers a user wants to use in business purposes only automatically may be stored in the messenger.

Consequently, a user's personal information may be exposed to others whom the user does not want to share with, and therefore, the risks of leakage of user's private information are enormous and growing. As such, there has been a growing demand for technology to separately manage telephone numbers that are frequently used, but they are rarely used to share a user's private matter.

The above references are incorporated by reference herein where appropriate for appropriate teachings of additional or alternative details, features and/or technical background.

BRIEF DESCRIPTION OF THE DRAWINGS

The embodiments will be described in detail with reference to the following drawings in which like reference numerals refer to like elements wherein:

FIG. 1 is a block diagram illustrating a mobile terminal according to an embodiment disclosed in the present disclosure;

FIG. 12 is a conceptual view illustrating a user interface configured to display a plurality of memos associated with a phone number according to an embodiment;

DETAILED DESCRIPTION

Figure 2A:
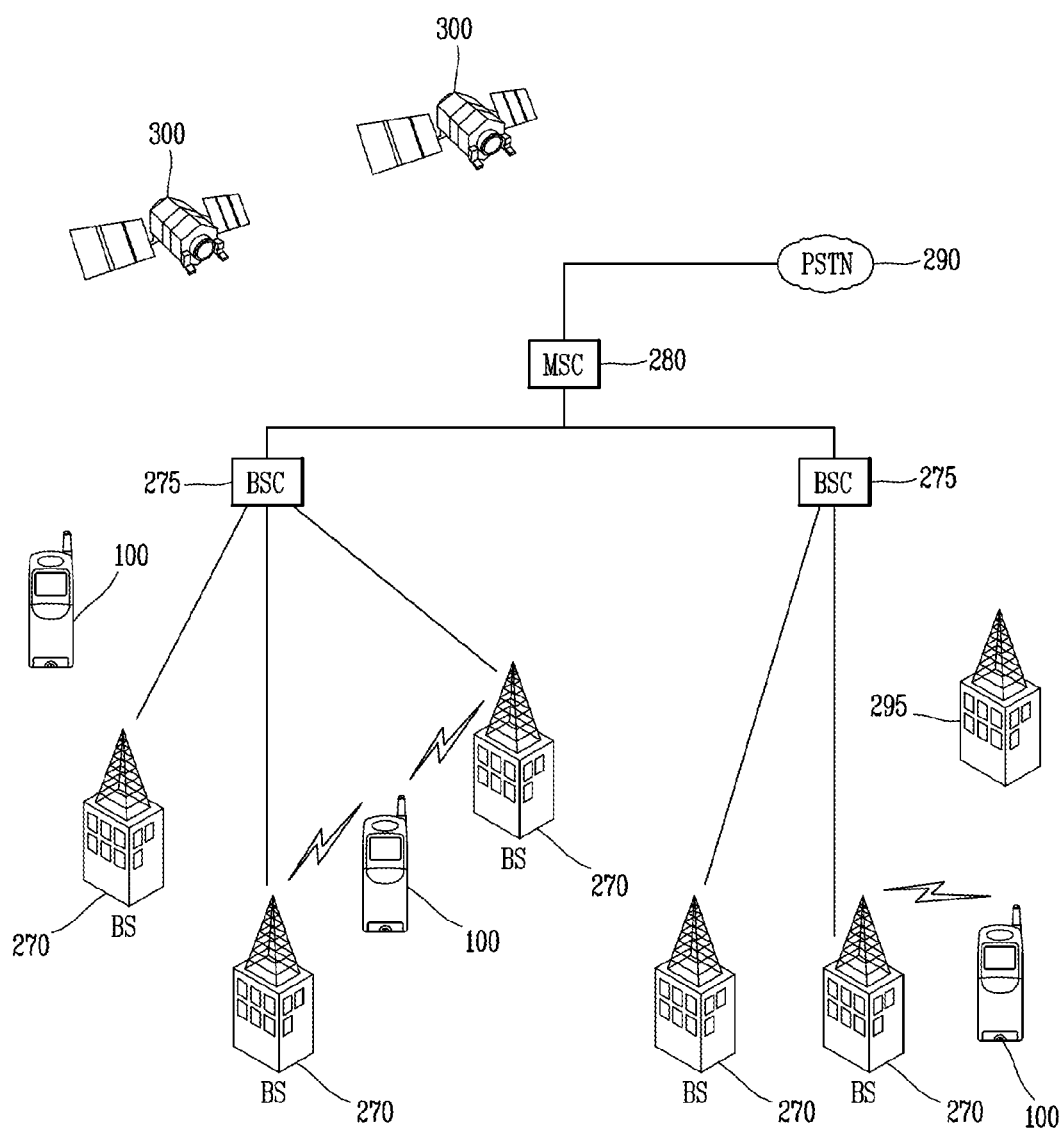
FIGS. 2A and 2B are conceptual views illustrating a communication system in which a mobile terminal according to the present disclosure is operable.

Hereinafter, preferred embodiments of the present disclosure will be described in detail with reference to the accompanying drawings, and the same or similar elements are designated with the same numeral references regardless of the numerals in the drawings and their redundant description will be omitted. A suffix "module" or "unit" used for constituent elements disclosed in the following description is merely intended for easy description of the specification, and the suffix itself does not give any special meaning or function. In describing the present disclosure, moreover, the detailed description will be omitted when a specific description for publicly known technologies to which the disclosure pertains is judged to obscure the gist of the present disclosure.

A mobile terminal disclosed herein may include a portable phone, a smart phone, a laptop computer, a digital broadcast mobile device, a personal digital assistant (PDA), a mobile multimedia player (PMP), a navigation, a slate PC, a tablet PC, an ultrabook, and the like. However, it would be easily understood by those skilled in the art that a configuration according to the following description may be applicable to a stationary terminal such as a digital TV, a desktop computer, and the like, excluding constituent elements particularly configured for mobile purposes.

FIG. 1 is a block diagram illustrating a mobile terminal 100 according to an embodiment disclosed in the present disclosure.

The mobile terminal 100 may include a wireless communication unit 110, an audio/video (A/V) input unit 120, a user input unit 130, a sensing unit 140, an output unit 150, a memory 160, an interface unit 170, a controller 180, a power supply unit 190, and the like. However, the constituent elements as illustrated in FIG. 1 are not necessarily required, and the mobile communication terminal may be implemented with greater or less number of elements than those illustrated elements.

Hereinafter, the foregoing constituent elements will be described in sequence.

The wireless communication unit 110 may include one or more modules allowing radio communication between the mobile terminal 100 and a wireless communication system, or allowing radio communication between the mobile terminal 100 and a network in which the mobile terminal 100 is located. For example, the wireless communication unit 110 may include at least one of a broadcast receiving module 111, a mobile communication module 112, a wireless Internet module 113, a short-range communication module 114, a location information module 115, and the like.

The broadcast receiving module 111 receives a broadcast signal and/or broadcast associated information from an external broadcast managing entity via a broadcast channel.

The broadcast channel may include a satellite channel and a terrestrial channel. The broadcast managing entity may indicate a server which generates and transmits a broadcast signal and/or broadcast associated information or a server which receives a pre-generated broadcast signal and/or broadcast associated information and sends them to the mobile terminal. The broadcast signal may be implemented as a TV broadcast signal, a radio broadcast signal, and a data broadcast signal, among others. The broadcast signal may further include a data broadcast signal combined with a TV or radio broadcast signal.

Examples of broadcast associated information may include information associated with a broadcast channel, a broadcast program, a broadcast service provider, and the like. The broadcast associated information may be provided via a mobile communication network, and received by the mobile communication module 112.

The broadcast associated information may be implemented in various formats. For instance, broadcast associated information may include Electronic Program Guide (EPG) of Digital Multimedia Broadcasting (DMB), Electronic Service Guide (ESG) of Digital Video Broadcast-Handheld (DVB-H), and the like.

The broadcast receiving module 111 may be configured to receive digital broadcast signals transmitted from various types of broadcast systems. Such broadcast systems may include Digital Multimedia Broadcasting-Terrestrial (DMB-T), Digital Multimedia Broadcasting-Satellite (DMB-S), Media Forward Link Only (MediaFLO), Digital Video Broadcast-Handheld (DVB-H), Integrated Services Digital Broadcast-Terrestrial (ISDB-T) and the like. Of course, the broadcast receiving module 111 may be configured to be suitable for every broadcast system transmitting broadcast signals as well as the digital broadcasting systems.

Broadcast signals and/or broadcast associated information received via the broadcast receiving module 111 may be stored in a memory 160.

The mobile communication module 112 transmits and receives wireless signals to and from at least one a base station, an external terminal and a server on a mobile communication network. Here, the wireless signals may include audio call signals, video call signals, or various formats of data according to the transmission and reception of text/multimedia messages.

The mobile communication module 112 may be configured to implement a video communication mode and a voice communication mode. The video communication mode refers to a configuration in which communication is made while viewing the image of the counterpart, and the voice communication mode refers to a configuration in which communication is made without viewing the image of the counterpart. The mobile communication module 112 may be configured to transmit or receive at least one of audio or video data to implement the video communication mode and voice communication mode.

The wireless Internet module 113 refers to a module for supporting wireless Internet access, and may be built-in or externally installed on the mobile terminal 100. Here, it may be used a wireless Internet access technique including WLAN (Wireless LAN), Wi-Fi (Wireless Fidelity) Direct, DLNA (Digital Living Network Alliance), Wibro (Wireless Broadband), Wimax (World Interoperability for Microwave Access), HSDPA (High Speed Downlink Packet Access), and the like.

The short-range communication module 114 refers to a module for supporting a short-range communication. Here, it may be used a short-range communication technology including Bluetooth™, Radio Frequency IDentification (RFID), Infrared Data Association (IrDA), Ultra WideBand (UWB), ZigBee, Near Field Communication (NFC) and the like.

The location information module 115 is a module for checking or acquiring the location of the mobile terminal, and there is a Global Positioning Module (GPS) module or Wireless Fidelity (WiFI) as a representative example.

Referring to FIG. 1, the A/V (audio/video) input unit 120 receives an audio or video signal, and the A/V (audio/video) input unit 120 may include a camera 121 and a microphone 122. The camera 121 processes image frames, such as still or moving images, obtained by an image sensor in a video phone call or image capturing mode. The processed image frame may be displayed on a display unit 151.

The image frames processed by the camera 121 may be stored in the memory 160 or transmitted to an external device through the wireless communication unit 110. Furthermore, the user's location information or the like may be produced from image frames acquired from the camera 121. Two or more cameras 121 may be provided according to the use environment.

The microphone 122 receives an external audio signal through a microphone in a phone call mode, a recording mode, a voice recognition mode, and the like, and processes the audio signal into electrical voice data. The processed voice data may be converted and outputted into a format that is transmittable to a mobile communication base station through the mobile communication module 112 in the phone call mode. The microphone 122 may implement various types of noise canceling algorithms to cancel noise generated in a procedure of receiving the external audio signal.

The user input unit 130 may generate input data to control an operation of the terminal. The user input unit 130 may be configured by including a keypad, a dome switch, a touch pad (pressure/capacitance), a jog wheel, a jog switch, and the like.

The sensing unit 140 detects a current status of the mobile terminal 100 such as an opened or closed configuration of the mobile terminal 100, a location of the mobile terminal 100, a presence or absence of user contact with the mobile terminal 100, an orientation of the mobile terminal 100, an acceleration/deceleration of the mobile terminal 100, and the like, so as to generate a sensing signal for controlling the operation of the mobile terminal 100. For example, when the mobile terminal 100 is a slide phone type, the sensing unit 140 may sense whether a sliding portion of the mobile terminal is open or closed. Other examples include sensing functions, such as the sensing unit 140 sensing the presence or absence of power provided by the power supply unit 190, the presence or absence of a coupling between the interface unit 170 and an external device.

The output unit 150 is configured to generate an output associated with visual sense, auditory sense or tactile sense, and may include a display unit 151, an audio output module 153, an alarm unit 154, a haptic module 155, and the like.

The display unit 151 may display (output) information processed in the mobile terminal 100. For example, when the mobile terminal 100 is in a phone call mode, the display unit 151 may display a User Interface (UI) or a Graphic User Interface (GUI) associated with a call. When the mobile terminal 100 is in a video call mode or image capturing mode, the display unit 151 may display a captured image and/or received image, a UI or GUI.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, and an e-ink display.

Some of those displays may be configured with a transparent or optical transparent type to allow viewing of the exterior through the display unit, which may be called transparent displays. An example of the typical transparent displays may include a transparent LCD (TOLED), and the like. Under this configuration, a user can view an object positioned at a rear side of a mobile terminal body through a region occupied by the display unit 151 of the mobile terminal body.

Two or more display units 151 may be implemented according to a configured aspect of the mobile terminal 100. For instance, a plurality of the display units 151 may be arranged on one surface to be spaced apart from or integrated with each other, or may be arranged on different surfaces.

Furthermore, the display unit 151 may be configured with a stereoscopic display unit 152 for displaying a stereoscopic image.

Here, stereoscopic image indicates a 3-dimensional stereoscopic image, and the 3-dimensional stereoscopic image is an image for allowing the user to feel the gradual depth and reality of an object located on the monitor or screen as in a real space. The 3-dimensional stereoscopic image may be implemented by using binocular disparity. Here, binocular disparity denotes a disparity made by the location of two eyes separated from each other, allowing the user to feel the depth and reality of a stereoscopic image when two eyes see different two-dimensional images and then the images are transferred through the retina and merged in the brain as a single image.

A stereoscopic method (glasses method), an auto-stereoscopic method (no-glasses method), a projection method (holographic method), and the like may be applicable to the stereoscopic display unit 152. The stereoscopic method primarily used in a home television receiver and the like may include a Wheatstone stereoscopic method and the like.

The examples of the auto-stereoscopic method may include a parallel barrier method, a lenticular method, an integral imaging method, and the like. The projection method may include a reflective holographic method, a transmissive holographic method, and the like.

In general, a 3-dimensional stereoscopic image may include a left image (image for the left eye) and a right image (image for the right eye). The method of implementing a 3-dimensional stereoscopic image can be divided into a top-down method in which a left image and a right image are disposed at the top and bottom within a frame, a left-to-right (L-to-R) or side by side method in which a left image and a right image are disposed at the left and right within a frame, a checker board method in which the pieces of a left image and a right image are disposed in a tile format, an interlaced method in which a left and a right image are alternately disposed for each column and row unit, and a time sequential or frame by frame method in which a left image and a right image are alternately displayed for each time frame, according to the method of combining a left image and a right image into a 3-dimensional stereoscopic image.

For 3-dimensional thumbnail images, a left image thumbnail and a right image thumbnail may be generated from the left and the right image of the original image frame, and then combined with each other to generate a 3-dimensional stereoscopic image. Typically, thumbnail denotes a reduced image or reduced still video. The left and right thumbnail image generated in this manner are displayed with a left and right distance difference on the screen in a depth corresponding to the disparity of the left and right image, thereby implementing a stereoscopic space feeling.

A left image and a right image required to implement a 3-dimensional stereoscopic image are displayed on the stereoscopic display unit 152 by a stereoscopic processing unit (not shown). The stereoscopic processing unit receives a 3D image to extract a left image and a right image from the 3D image, or receives a 2D image to convert it into a left image and a right image.

On the other hand, when the display unit 151 and a touch sensitive sensor (hereinafter, referred to as a "touch sensor") have an interlayer structure (hereinafter, referred to as a "touch screen"), the display unit 151 may be used as an input device in addition to an output device. The touch sensor may be implemented as a touch film, a touch sheet, a touch pad, and the like.

The touch sensor may be configured to convert changes of a pressure applied to a specific part of the display unit 151, or a capacitance occurring from a specific part of the display unit 151, into electric input signals. The touch sensor may be configured to sense not only a touched position and a touched area, but also a touch pressure at which a touch object body is touched on the touch sensor. Here, the touch object body may be a finger, a touch pen or stylus pen, a pointer, or the like as an object by which a touch is applied to the touch sensor.

When there is a touch input to the touch sensor, the corresponding signals are transmitted to a touch controller. The touch controller processes the signal(s), and then transmits the corresponding data to the controller 180. Accordingly, the controller 180 may sense which region of the display unit 151 has been touched.

Referring to FIG. 1, a proximity sensor 141 may be arranged at an inner region of the mobile device 100 surrounded by the touch screen, or adjacent to the touch screen. The proximity sensor 141 may be provided as an example of the sensing unit 140. The proximity sensor 141 refers to a sensor to sense the presence or absence of an object approaching to a surface to be sensed, or an object disposed adjacent to a surface to be sensed, by using an electromagnetic field or infrared rays without a mechanical contact. The proximity sensor 141 has a longer lifespan and a more enhanced utility than a contact sensor.

The proximity sensor 141 may include an optical transmission type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, the proximity of an object having conductivity (hereinafter, referred to as a "pointer") to the touch screen is sensed by changes of an electromagnetic field. In this case, the touch screen (touch sensor) may be categorized into a proximity sensor.

Hereinafter, for the sake of convenience of brief explanation, a behavior that the pointer is positioned to be proximate onto the touch screen without contact will be referred to as a "proximity touch", whereas a behavior that the pointer substantially comes in contact with the touch screen will be referred to as a "contact touch". For the position corresponding to the proximity touch of the pointer on the touch screen, such position corresponds to a position where the pointer faces perpendicular to the touch screen upon the proximity touch of the pointer.

The proximity sensor 141 senses a proximity touch, and a proximity touch pattern (e.g., proximity touch distance, proximity touch direction, proximity touch speed, proximity touch time, proximity touch position, proximity touch moving status, etc.). Information relating to the sensed proximity touch and the sensed proximity touch patterns may be output onto the touch screen.

When the stereoscopic display unit 152 and a touch sensor are configured with an interlayer structure (hereinafter, referred to as a "stereoscopic touch screen") or the stereoscopic display unit 152 and a 3D sensor for detecting a touch operation are combined with each other, the stereoscopic display unit 152 may be used as a 3-dimensional input device.

As an example of the 3D sensor, the sensing unit 140 may include a proximity sensor 141, a stereoscopic touch sensing unit 142, a ultrasound sensing unit 143, and a camera sensing unit 144.

The proximity sensor 141 measures a distance between the sensing object (for example, the user's finger or stylus pen) and a detection surface to which a touch is applied using an electromagnetic field or infrared rays without a mechanical contact. The terminal may recognize which portion of a stereoscopic image has been touched by using the measured distance. In particular, when the touch screen is implemented with a capacitance type, it may be configured such that the proximity level of a sensing object is sensed by changes of an electromagnetic field according to the proximity of the sensing object to recognize a 3-dimensional touch using the proximity level.

The stereoscopic touch sensing unit 142 may be configured to sense the strength or duration time of a touch applied to the touch screen. For example, stereoscopic touch sensing unit 142 senses a user applied touch pressure, and if the applied pressure is strong, then the stereoscopic touch sensing unit 142 recognizes it as a touch for an object located farther from the touch screen.

The ultrasound sensing unit 143 may be configured to sense the location of the sensing object using ultrasound.

For example, the ultrasound sensing unit 143 may be configured with an optical sensor and a plurality of ultrasound sensors. The optical sensor may be formed to sense light, and the ultrasound sensor may be formed to sense ultrasound waves. Since light is far faster than ultrasound waves, the time for light to reach the optical sensor is far faster than the time for ultrasound waves to reach the ultrasound sensor. Accordingly, the location of the wave generating source may be calculated using a time difference between the light and ultrasound waves to reach the optical sensor.

The camera sensing unit 144 may include at least one of a camera 121, a photo sensor, and a laser sensor.

For example, the camera 121 and laser sensor may be combined to each other to sense a touch of the sensing object to a 3-dimensional stereoscopic image. Distance information sensed by the laser sensor is added to a two-dimensional image captured by the camera to acquire 3-dimensional information.

For another example, a photo sensor may be deposited on the display element. The photo sensor may be configured to scan the motion of the sensing object in proximity to the touch screen. More specifically, the photo sensor is integrated with photo diodes and transistors in the rows and columns thereof, and a content placed on the photo sensor may be scanned by using an electrical signal that is changed according to the amount of light applied to the photo diode. In other words, the photo sensor performs the coordinate calculation of the sensing object according to the changed amount of light, and the location coordinate of the sensing object may be detected through this.

The audio output module 153 may output audio data received from the wireless communication unit 110 or stored in the memory 160, in a call-receiving mode, a call-placing mode, a recording mode, a voice recognition mode, a broadcast reception mode, and so on. The audio output module 153 may output audio signals relating to the functions performed in the mobile terminal 100 (e.g., sound alarming a call received or a message received, and so on). The audio output module 153 may include a receiver, a speaker, a buzzer, and so on.

The alarm 154 outputs signals notifying occurrence of events from the mobile terminal 100. The events occurring from the mobile terminal 100 may include call received, message received, key signal input, touch input, and so on. The alarm 154 may output not only video or audio signals, but also other types of signals such as signals notifying occurrence of events in a vibration manner. Since the video or audio signals can be output through the display unit 151 or the audio output unit 153, the display unit 151 and the audio output module 153 may be categorized into part of the alarm 154.

The haptic module 155 generates various tactile effects which a user can feel. A representative example of the tactile effects generated by the haptic module 154 includes vibration. Vibration generated by the haptic module 154 may have a controllable intensity, a controllable pattern, and so on. For instance, different vibration may be output in a synthesized manner or in a sequential manner.

The haptic module 155 may generate various tactile effects, including not only vibration, but also arrangement of pins vertically moving with respect to a skin being touched, air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like.

The haptic module 155 may be configured to transmit tactile effects through a user's direct contact, or a user's muscular sense using a finger or a hand. The haptic module 155 may be implemented in two or more in number according to the configuration of the mobile terminal 100.

The memory 160 may store a program for processing and controlling the controller 180. Alternatively, the memory 160 may temporarily store input/output data (e.g., phonebook, messages, still images, videos, and the like). Also, the memory 160 may store data related to various patterns of vibrations and sounds outputted upon the touch input on the touch screen.

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the mobile terminal 100 may operate in association with a web storage which performs the storage function of the memory 160 on the Internet.

The interface unit 170 may generally be implemented to interface the mobile terminal with external devices connected to the mobile terminal 100. The interface unit 170 may allow a data reception from an external device, a power delivery to each component in the mobile terminal 100, or a data transmission from the mobile terminal 100 to an external device. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like.

On the other hand, the identification module may be configured as a chip for storing various information required to authenticate an authority to use the mobile terminal 100, which may include a User Identity Module (UIM), a Subscriber Identity Module (SIM), and the like. Also, the device having the identification module (hereinafter, referred to as "identification device") may be implemented in a type of smart card. Hence, the identification device can be coupled to the mobile terminal 100 via a port.

Furthermore, the interface unit 170 may serve as a path for power to be supplied from an external cradle to the mobile terminal 100 when the mobile terminal 100 is connected to the external cradle or as a path for transferring various command signals inputted from the cradle by a user to the mobile terminal 100. Such various command signals or power inputted from the cradle may operate as signals for recognizing that the mobile terminal 100 has accurately been mounted to the cradle.

The controller 180 typically controls the overall operations of the mobile terminal 100. For example, the controller 180 performs the control and processing associated with telephony calls, data communications, video calls, and the like. The controller 180 may include a multimedia module 181 which provides multimedia playback. The multimedia module 181 may be configured as part of the controller 180 or as a separate component.

Furthermore, the controller 180 can perform a pattern recognition processing so as to recognize writing or drawing input carried out on the touch screen as text or image.

Furthermore, the controller 180 may implement a lock state for limiting the user's control command input to applications when the state of the mobile terminal satisfies a preset condition. Furthermore, the controller 180 may control a lock screen displayed in the lock state based on a touch input sensed through the display unit 151 in the lock state.

The power supply unit 190 receives external and internal power to provide power required for various components under the control of the controller 180.

Various embodiments described herein may be implemented in a computer or similar device readable medium using software, hardware, or any combination thereof.

For hardware implementation, it may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electrical units designed to perform the functions described herein. In some cases, such embodiments may be implemented in the controller 180 itself.

For software implementation, the embodiments such as procedures or functions described in the present disclosure may be implemented with separate software modules. Each of the software modules may perform at least one function or operation described in the present disclosure.

Software codes can be implemented by a software application written in any suitable programming language. The software codes may be stored in the memory 160 and executed by the controller 180.

Next, a communication system that can be implemented through the mobile terminal 100 according to the present disclosure will be described.

Figure 2B:
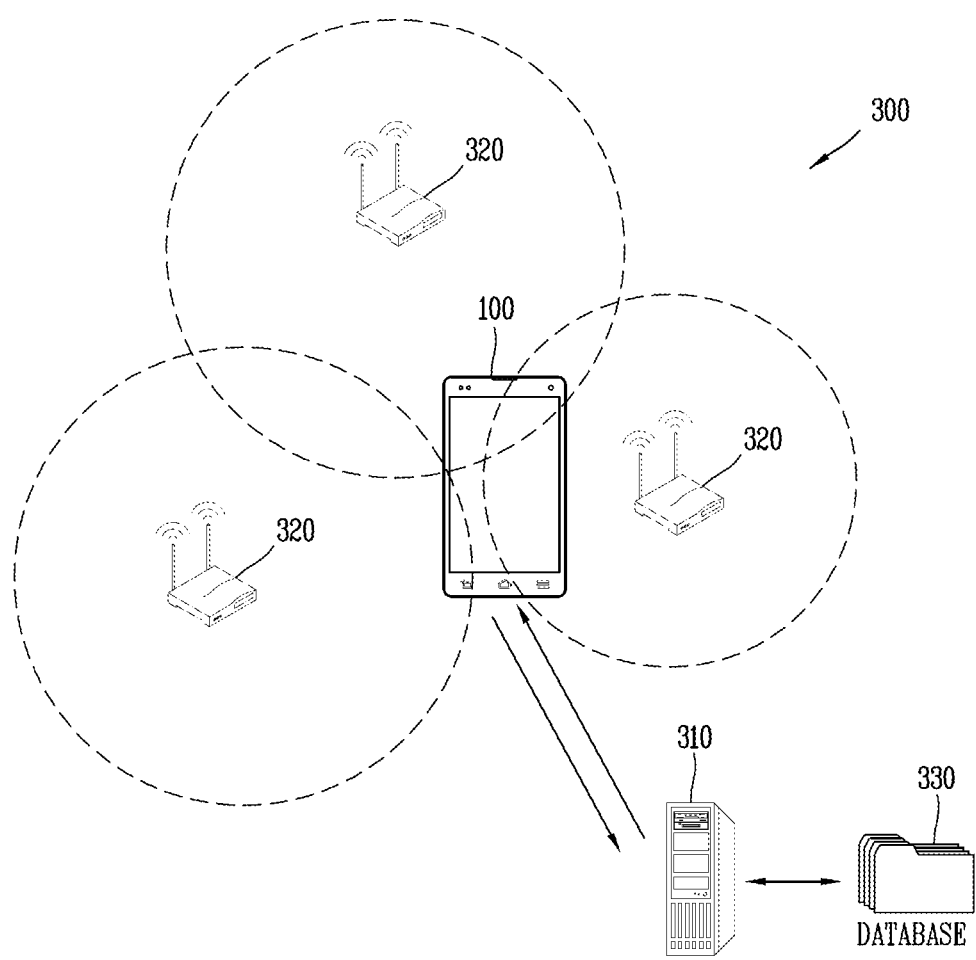

FIGS. 2A and 2B are conceptual views illustrating a communication system in which a mobile terminal 100 according to the present disclosure is operable.

First, referring to FIG. 2A, the communication system may use different wireless interfaces and/or physical layers. For example, wireless interfaces that can be used by the communication system may include, frequency division multiple access (FDMA), time division multiple access (TDMA), code division multiple access (CDMA), universal mobile telecommunications system (UMTS) (particularly, long term evolution (LTE)), global system for mobile communications (GSM), and the like.

Hereinafter, for the sake of convenience of explanation, the description disclosed herein will be limited to CDMA. However, it is apparent that the present invention may be also applicable to all communication systems including a CDMA wireless communication system.

As illustrated in FIG. 2A, a CDMA wireless communication system may include a plurality of terminals 100, a plurality of base stations (BSs) 270, a plurality of base station controllers (BSCs) 275, and a mobile switching center (MSC) 280. The MSC 280 may interface with a Public Switched Telephone Network (PSTN) 290, and the MSC 280 may also interface with the BSCs 275. The BSCs 275 may be connected to the BSs 270 via backhaul lines. The backhaul lines may be configured in accordance with at least any one of E1/T1, ATM, IP, PPP, Frame Relay, HDSL, ADSL, or xDSL, for example. Further, the system illustrated in FIG. 2A may include a plurality of BSCs 275.

Each of the plurality of BSs 270 may include at least one sector, each sector having an omni-directional antenna or an antenna indicating a particular radial direction from the base station 270. Alternatively, each sector may include two or more antennas with various forms. Each of the BSs 270 may be configured to support a plurality of frequency assignments, each frequency assignment having a particular spectrum (for example, 1.25 MHz, 5 MHz, etc.).

The intersection of a sector and frequency assignment may be referred to as a CDMA channel. The BSs 270 may also be referred to as Base Station Transceiver Subsystems (BTSs). In this case, the term "base station" may collectively refer to a BSC 275, and at least one BS 270. The base stations may also indicate "cell sites". Alternatively, individual sectors for a specific BS 270 may also be referred to as a plurality of cell sites.

As illustrated in FIG. 2A, the Broadcasting Transmitter (BT) 295 may transmit broadcasting signals to the mobile terminals 100 being operated within the system. The broadcast receiving module 111 as illustrated in FIG. 1 may be provided in the mobile terminal 100 to receive broadcast signals transmitted by the BT 295.

In addition, FIG. 2A illustrates several global positioning system (GPS) satellites 300. Such satellites 300 facilitate locating at least one of a plurality of mobile terminals 100. Though two satellites are illustrated in FIG. 2A, location information may be obtained with a greater or fewer number of satellites. The location information module 115 as illustrated in FIG. 1 may cooperate with the satellites 300 as illustrated in FIG. 2A to obtain desired location information. However, other types of position detection technology, all types of technologies capable of tracing the location may be used in addition to a GPS location technology. Furthermore, at least one of the GPS satellites 300 may alternatively or additionally provide satellite DMB transmissions.

During the operation of a wireless communication system, the BS 270 may receive reverse-link signals from various mobile terminals 100. At this time, the mobile terminals 100 may perform calls, message transmissions and receptions, and other communication operations. Each reverse-link signal received by a specific base station 270 may be processed within that specific base station 270. The processed resultant data may be transmitted to an associated BSC 275. The BSC 275 may provide call resource allocation and mobility management functions including the systemization of soft handoffs between the base stations 270. Furthermore, the BSCs 275 may also transmit the received data to the MSC 280, which provides additional transmission services for interfacing with the PSTN 290. Furthermore, similarly, the PSTN 290 may interface with the MSC 280, and the MSC 280 may interface with the BSCs 275. The BSCs 275 may also control the BSs 270 to transmit forward-link signals to the mobile terminals 100.

Next, a method of acquiring the location information of a mobile terminal using a WiFi (Wireless Fidelity) positioning system (WPS) will be described with reference to FIG. 2B.

The WiFi positioning system (WPS) 300 refers to a location determination technology based on a wireless local area network (WLAN) using WiFi as a technology for tracking the location of the mobile terminal 100 using a WiFi module provided in the mobile terminal 100 and a wireless access point 320 for transmitting and receiving to and from the WiFi module.

The WiFi positioning system 300 may include a WiFi location determination server 310, a mobile terminal 100, a wireless access point (AP) 320 connected to the mobile terminal 100, and a database 330 stored with any wireless AP information.

The WiFi location determination server 310 extracts the information of the wireless AP 320 connected to the mobile terminal 100 based on a location information request message (or signal) of the mobile terminal 100. The information of the wireless AP 320 may be transmitted to the WiFi location determination server 310 through the mobile terminal 100 or transmitted to the WiFi location determination server 310 from the wireless AP 320.

The information of the wireless AP extracted based on the location information request message of the mobile terminal 100 may be at least one of MAC address, SSID, RSSI, channel information, privacy, network type, signal strength and noise strength.

The WiFi location determination server 310 receives the information of the wireless AP 320 connected to the mobile terminal 100 as described above, and compares the received wireless AP 320 information with information contained in the pre-established database 330 to extract (or analyze) the location information of the mobile terminal 100.

On the other hand, referring to FIG. 2B, as an example, the wireless AP connected to the mobile terminal 100 is illustrated as a first, a second, and a third wireless AP 320. However, the number of wireless APs connected to the mobile terminal 100 may be changed in various ways according to a wireless communication environment in which the mobile terminal 100 is located. When the mobile terminal 100 is connected to at least one of wireless APs, the WiFi positioning system 300 can track the location of the mobile terminal 100.

Next, considering the database 330 stored with any wireless AP information in more detail, various information of any wireless APs disposed at different locations may be stored in the database 330.

The information of any wireless APs stored in the database 330 may be information such as MAC address, SSID, RSSI, channel information, privacy, network type, latitude and longitude coordinate, building at which the wireless AP is located, floor number, detailed indoor location information (GPS coordinate available), AP owner's address, phone number, and the like.

In this manner, any wireless AP information and location information corresponding to the any wireless AP are stored together in the database 330, and thus the WiFi location determination server 310 may retrieve wireless AP information corresponding to the information of the wireless AP 320 connected to the mobile terminal 100 from the database 330 to extract the location information matched to the searched wireless AP, thereby extracting the location information of the mobile terminal 100.

Furthermore, the extracted location information of the mobile terminal 100 may be transmitted to the mobile terminal 100 through the WiFi location determination server 310, thereby acquiring the location information of the mobile terminal 100.

Hereinafter, a mobile terminal according to an embodiment of the present disclosure as illustrated in FIG. 1 or a mobile terminal disposed with the constituent elements of the mobile terminal or the structure of a mobile terminal will be described.

Figure 3A:
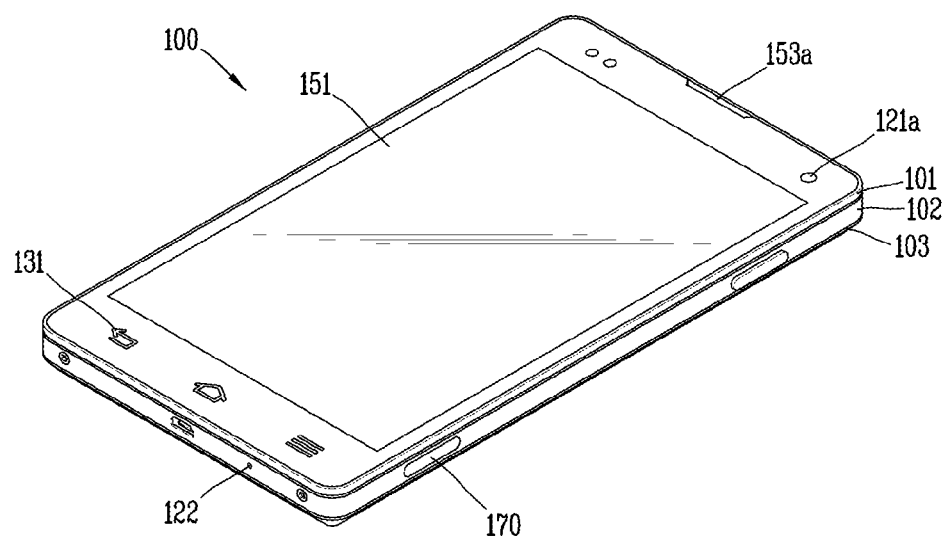
FIG. 3A is a front perspective view illustrating an example of a mobile terminal associated with the present disclosure.

FIG. 3A is a front perspective view illustrating an example of the mobile terminal 100 associated with the present disclosure.

The mobile terminal 100 disclosed herein is provided with a bar-type terminal body. However, the present invention may not be limited to this, but also may be applicable to various structures such as watch type, clip type, glasses type or folder type, flip type, swing type, swivel type, or the like, in which two and more bodies are combined with each other in a relatively movable manner.

The body includes a case (casing, housing, cover, etc.) forming the appearance of the terminal. In this embodiment, the case may be divided into a front case 101 and a rear case 102. Various electronic components is incorporated into a space formed between the front case 101 and the rear case 102. At least one middle case may be additionally disposed between the front case 101 and the rear case 102, and a battery cover 103 for covering the battery 191 may be detachably configured at the rear case 102.

The cases may be formed by injection-molding a synthetic resin or may be also formed of a metal, for example, stainless steel (STS), titanium (Ti), or the like.

A display unit 151, a first audio output module 153a, a first camera 121a, a first manipulating unit 131 and the like may be disposed on a front surface of the terminal body, and a microphone 122, an interface unit 170, a second manipulating unit 132 and the like may be provided on a lateral surface thereof.

The display unit 151 may be configured to display (output) information being processed in the mobile terminal 100. The display unit 151 may include at least one of a liquid crystal display (LCD), a thin film transistor-liquid crystal display (TFT-LCD), an organic light emitting diode (OLED) display, a flexible display, a 3-dimensional (3D) display, and an e-ink display.

The display unit 151 may include a touch sensing means to receive a control command by a touch method. When a touch is made to any one place on the display unit 151, the touch sensing means may be configured to sense this touch and enter the content corresponding to the touched place. The content entered by a touch method may be a text or numerical value, or a menu item capable of indication or designation in various modes.

The touch sensing means may be formed with transparency to allow visual information displayed on the display unit 151 to be seen, and may include a structure for enhancing the visibility of a touch screen at bright places. Referring to FIG. 3A, the display unit 151 occupies a most portion of the front surface of the front case 101.

The first audio output unit 153a and the first camera 121a are disposed in a region adjacent to one of both ends of the display unit 151, and the first manipulation input unit 131 and the microphone 122 are disposed in a region adjacent to the other end thereof. The second manipulation interface 132 (refer to FIG. 3B), the interface 170, and the like may be disposed on a lateral surface of the terminal body.

The first audio output module 153a may be implemented in the form of a receiver for transferring voice sounds to the user's ear or a loud speaker for outputting various alarm sounds or multimedia reproduction sounds.

It may be configured such that the sounds generated from the first audio output module 153a are released along an assembly gap between the structural bodies. In this case, a hole independently formed to output audio sounds may not be seen or hidden in terms of appearance, thereby further simplifying the appearance of the mobile terminal 100. However, the present invention may not be limited to this, but a hole for releasing the sounds may be formed on the window.

The first camera 121a processes video frames such as still or moving images obtained by the image sensor in a video call mode or capture mode. The processed video frames may be displayed on the display unit 151.

The user input unit 130 is manipulated to receive a command for controlling the operation of the mobile terminal 100. The user input unit 130 may include a first and a second manipulation unit 131, 132. The first and the second manipulation unit 131, 132 may be commonly referred to as a manipulating portion, and any method may be employed if it is a tactile manner allowing the user to perform manipulation with a tactile feeling such as touch, push, scroll or the like.

In the present drawing, it is illustrated on the basis that the first manipulation unit 131 is a touch key, but the present disclosure may not be necessarily limited to this. For example, the first manipulation unit 131 may be configured with a mechanical key, or a combination of a touch key and a mechanical key.

The content received by the first and/or second manipulation units 131, 132 may be set in various ways. For example, the first manipulation unit 131 may be used to receive a command such as menu, home key, cancel, search, or the like, and the second manipulation unit 132 may receive a command, such as controlling a volume level being outputted from the first audio output module 153a, or switching into a touch recognition mode of the display unit 151.

The microphone 122 may be formed to receive the user's voice, other sounds, or the like. The microphone 122 may be provided at a plurality of places, and configured to receive stereo sounds.

The interface unit 170 serves as a path allowing the mobile terminal 100 to exchange data with external devices. For example, the interface unit 170 may be at least one of a connection terminal for connecting to an earphone in a wired or wireless manner, a port for near field communication (for example, an Infrared Data Association (IrDA) port, a Bluetooth port, a wireless LAN port, and the like), and a power supply terminal for supplying power to the mobile terminal 100. The interface unit 170 may be implemented in the form of a socket for accommodating an external card such as Subscriber Identification Module (SIM) or User Identity Module (UIM), and a memory card for information storage.

Figure 3B:
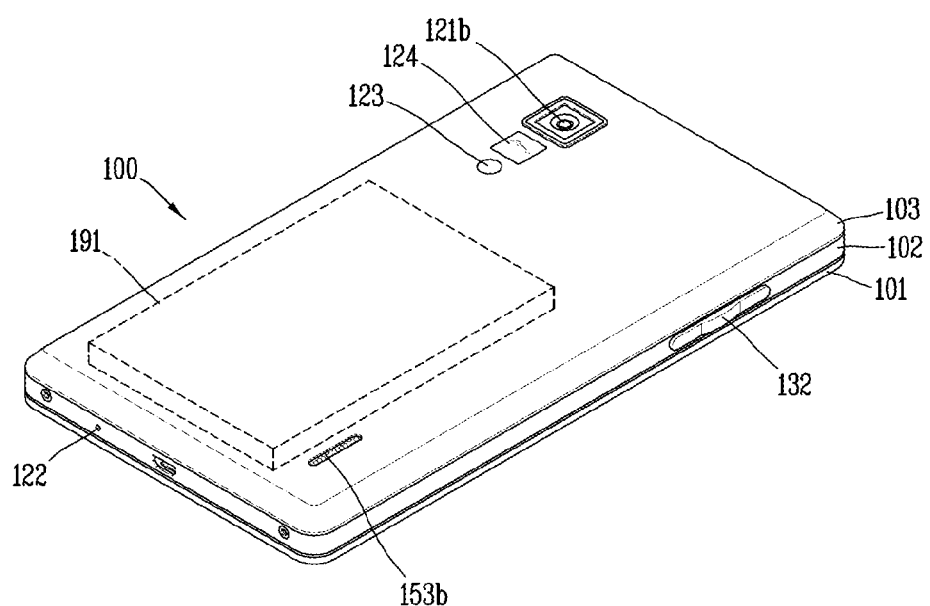
FIG. 3B is a rear perspective view illustrating a mobile terminal illustrated in FIG. 3A.

FIG. 3B is a rear perspective view illustrating mobile terminal 100 illustrated in FIG. 3A.

Referring to FIG. 3B, a second camera 121b may be additionally mounted at a rear surface of the terminal body, namely, the rear case 102. The second camera 121b has an image capturing direction, which is substantially opposite to the direction of the first camera unit 121a (refer to FIG. 3A), and may have a different number of pixels from that of the first camera unit 121a.

For example, it is preferable that the first camera 121a has a relatively small number of pixels enough not to cause difficulty when the user captures his or her own face and sends it to the other party during a video call or the like, and the second camera 121b has a relatively large number of pixels since the user often captures a general object that is not sent immediately. The first and the second camera 121a, 121b may be provided in the terminal body in a rotatable and popupable manner.

Furthermore, a flash 123 and a mirror 124 may be additionally disposed adjacent to the second camera 121b. The flash 123 illuminates light toward an object when capturing the object with the second camera 121b. The mirror 124 allows the user to look at his or her own face, or the like, in a reflected way when capturing himself or herself (in a self-portrait mode) by using the second camera 121b.

A second audio output unit 153b may be additionally disposed at a rear surface of the terminal body. The second audio output unit 153b together with the first audio output unit 153a (refer to FIG. 3A) can implement a stereo function, and may be also used to implement a speaker phone mode during a phone call.

An antenna (not shown) for receiving broadcast signals may be additionally disposed at a lateral surface of the terminal body in addition to an antenna for making a phone call or the like. The antenna constituting part of the broadcast receiving module 111 (refer to FIG. 1) may be provided in the terminal body in a retractable manner.

A power supply unit 190 (refer to FIG. 1) for supplying power to the mobile terminal 100 may be mounted on the terminal body. The power supply unit 190 may be incorporated into the terminal body, or may include a battery 191 configured in a detachable manner on the outside of the terminal body. According to the drawing, it is illustrated that the battery cover 103 is combined with the rear case 102 to cover the battery 191, thereby restricting the battery 191 from being released and protecting the battery 191 from external shocks and foreign substances.

On the other hand, messenger, such as social networking service (SNS), is allowed to automatically access to phone numbers stored in address book of mobile terminal. In this regard, the numbers that a user does not want to be linked to the messenger may automatically be stored in the SNS. For instance, as to the phone number stored in an address book and a user wants it to be used in business purposes only, the telephone number may be automatically stored in the messenger.

Hence, a user's personal information may be exposed to others whom the user does not want to share with, and therefore, the risks of leakage of user's private information are enormous and growing. As such, there has been a growing demand for technology to manage telephone numbers that are frequently used, but they are rarely used to share a user's private matter.

Accordingly, with reference to the accompanying drawing, preferred embodiment of the present disclosure is to describe mobile terminal 100 configured to improve a user's convenience by separately saving and managing telephone numbers not stored in the address book of the mobile terminal by using a call memo of the mobile terminal. Herein, the call memo refers to the function that activates memo input mode to load any content related with at least one phone number into the memo, wherein the phone number is not stored in an address book.

Figure 4:
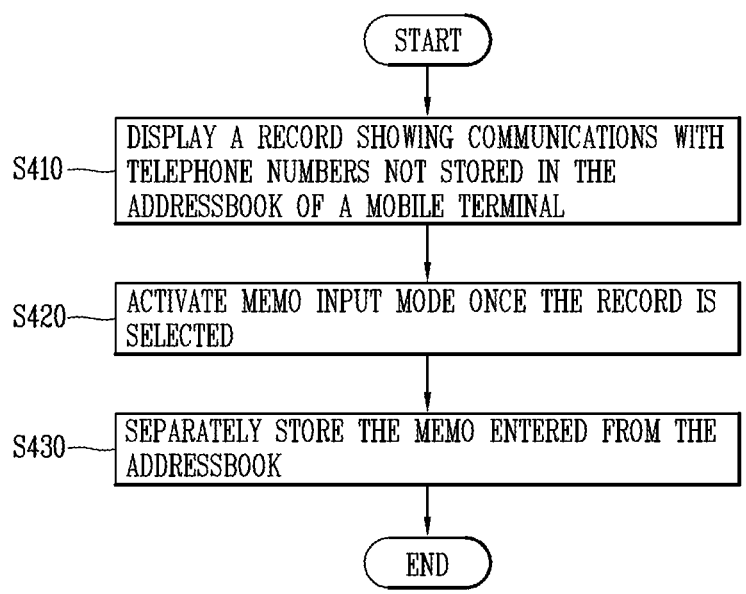
FIG. 4 is a flow chart showing operation of mobile terminal device according to an embodiment of the present disclosure.

FIG. 4 is a flow chart showing operation of mobile terminal device according to an embodiment of the present disclosure. The mobile terminal 100 includes a display unit 151 and a control unit 180.

With reference to FIG. 4, a display unit 151 displays records showing communications with at least one telephone number which is not stored in the address book of a mobile terminal 100 during step S410.

Specifically, the display unit 151 may display a record showing telecommunication or text message with a telephone number not stored in the address book of mobile terminal 100.

Subsequently, once the record is selected, the memo input mode is then activated, so a memo that is associated with the phone number may be entered during step S420.

Specifically, a user may activate the memo input mode by touching the record, so the memo associated with the phone numbers may be entered accordingly. For instance, a user may write a memo, such as "express mail," in the memo writing window in response to an incoming telephone call from an express mail agent, and consequently, the memo, along with the phone number, may be stored in a memory unit.

Herein, the memory unit may be a different set of data holding place distinguishable from an address book of a mobile terminal 100. As an exemplary embodiment, a back up memory or a supplementary address book that plays as a local memory may be implemented as the memory unit. Also, unlike most address books in mobile terminals, the memory unit may not automatically be linked to other messenger in computing system, such as social networking service (SNS).

Subsequently, the memo entered in association with the telephone number may then be separately stored from the address book during step S430.

Also, since having been saved in association with the telephone number, the original content of memo may be edited in the manner of deleting or revising; also, the original content may be supplemented with additional information, and as a result, the edited content may replace the original content and be saved accordingly.

Also, a new additional memo may be entered, so a plurality of memos associated with a telephone number may be stored in the memory unit.

Consequently, in response to a communication with the telephone number, a plurality of the memos associated with the telephone number may be displayed. For instance, when an incoming telephone call has an associated memo, the content of the memo entered may be displayed while a user holds answering the telephone call.

Figure 5:
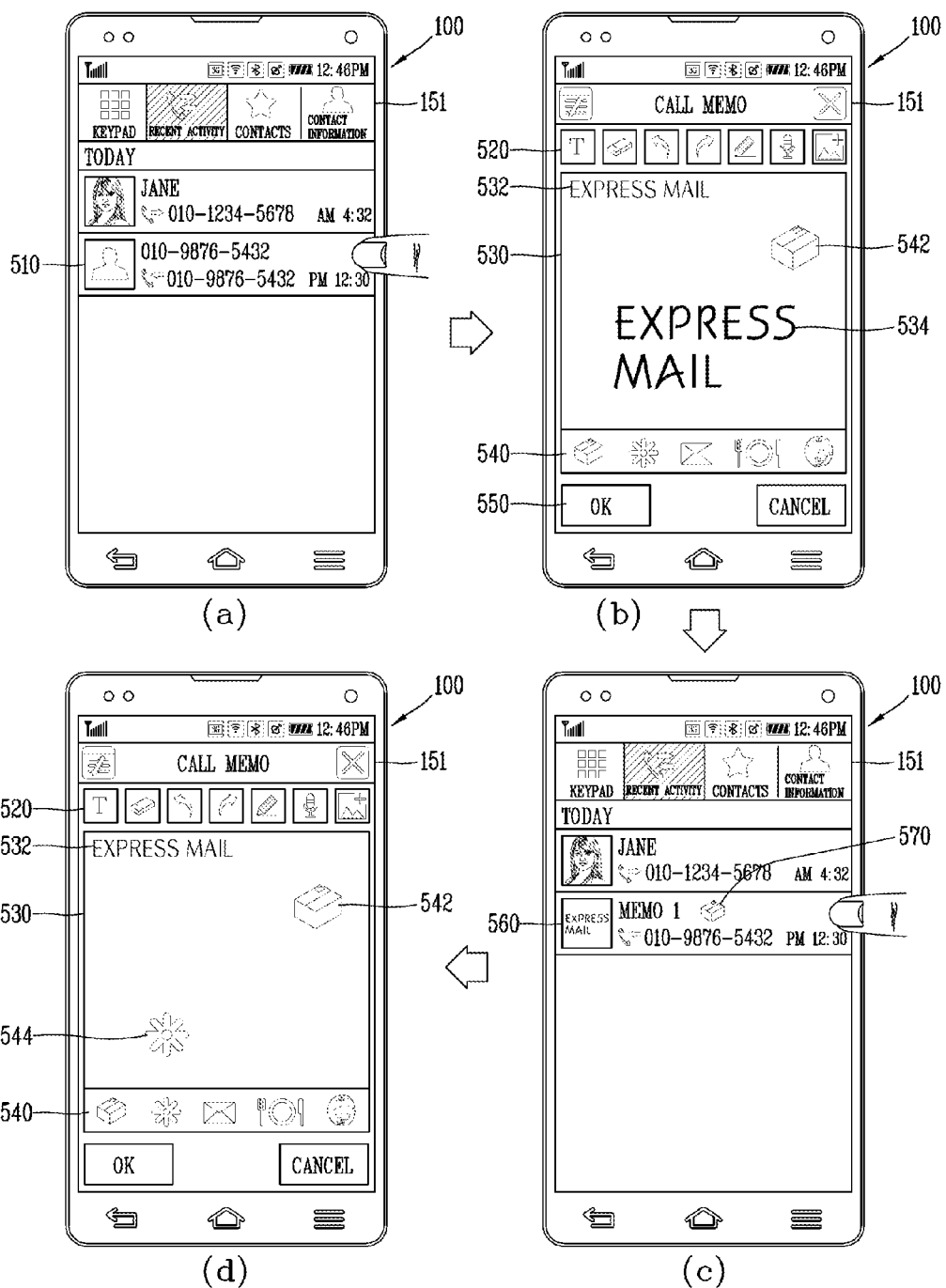
FIG. 5 is a conceptual view illustrating a user interface configured to enter the content of memo according to an embodiment.

FIG. 5 is a conceptual view illustrating a user interface configured to enter the content of memo according to an embodiment.

With reference to FIG. 5A, in a list of recent communication records, a user may touch and choose the record 510 of communication indicating conversation or text messages with a phone number that is not stored in the address book. Consequently, a memo input mode to enable memo input associated with the telephone number may be activated.

With reference to FIG. 5B, once the memo input mode becomes activated, a user interface may be displayed like shown in FIG. 5B.

Specifically, icons 520 configured to enable entering a memo may be displayed. For instance, a group of icons 520 for diverse functions, such as adjusting the style or size of lettering, deleting, browser's back and forward, loading an audio file, attaching files may be displayed.

Also, a memo pad 530 configured to enter contents into the memo may be displayed. As an exemplary embodiment, a user may enter a text 532 such as "express mail" or "door to door mail delivery" with a key pad for the telephone number of a mail courier. As another embodiment, the words 534 "express mail" may be entered with a user's finger or a touch pad.

Also, in the memo input mode, emoticon associated with the telephone number may be entered. As an exemplary embodiment, sticker icons 540 attachable on the memo pad 530 may be displayed. The sticker icons 540 may be set up as various symbols with express mail, junk, a workplace, restaurants, etc.

A user may attach one sticker icon to the memo pad 530 by dragging the one 542 of a group of sticker icons 540 to the desired spot. As an exemplary embodiment, for a telephone number of an express mail agent a user may drag and paste the sicker icon 542 to the memo pad 530.

Subsequently, once the user touches the "okay" icon 550, the drafted content of a memo associated with the telephone number are then stored in the memory unit: a different set of data holding place distinguishable from the address book.

With reference to FIG. 5C, it shows the drafted content of a memo on a list of recent communication records. Specifically, the whole or certain portions of contents of memo may be displayed; also, an attached sticker 570 may be displayed.

With reference to FIG. 5D, when the user touches an entry containing the drafted memo in a list of the recent communication shown in FIG. 5C, the content of memo previously entered, shown in FIG. 5B, may be displayed.

In this regard, the content that was previously entered may be deleted, edited, or supplemented with new information. In particular, a user may delete the content 534 of the memo that was originally entered or may attach a new sticker 544 to the memo. The edited content of the memo may be stored in the same location the original content has been stored or may be stored in a different location in the memory unit. For example, each of the memos shown in FIGS. 5B and 5D associated with the same telephone number may be stored individually.

As another exemplary embodiment, an initial screen configured to enable entering a new memo may be displayed, thus, a newly drafted memo may be stored separately from the location at which the previous memos were saved.

On the other hand, in response to a communication with the telephone number at least one memo associated with the telephone number may be displayed. Also, for a communication with the telephone number, a portion of at least one memo associated with the telephone number may be displayed.

Figure 6:
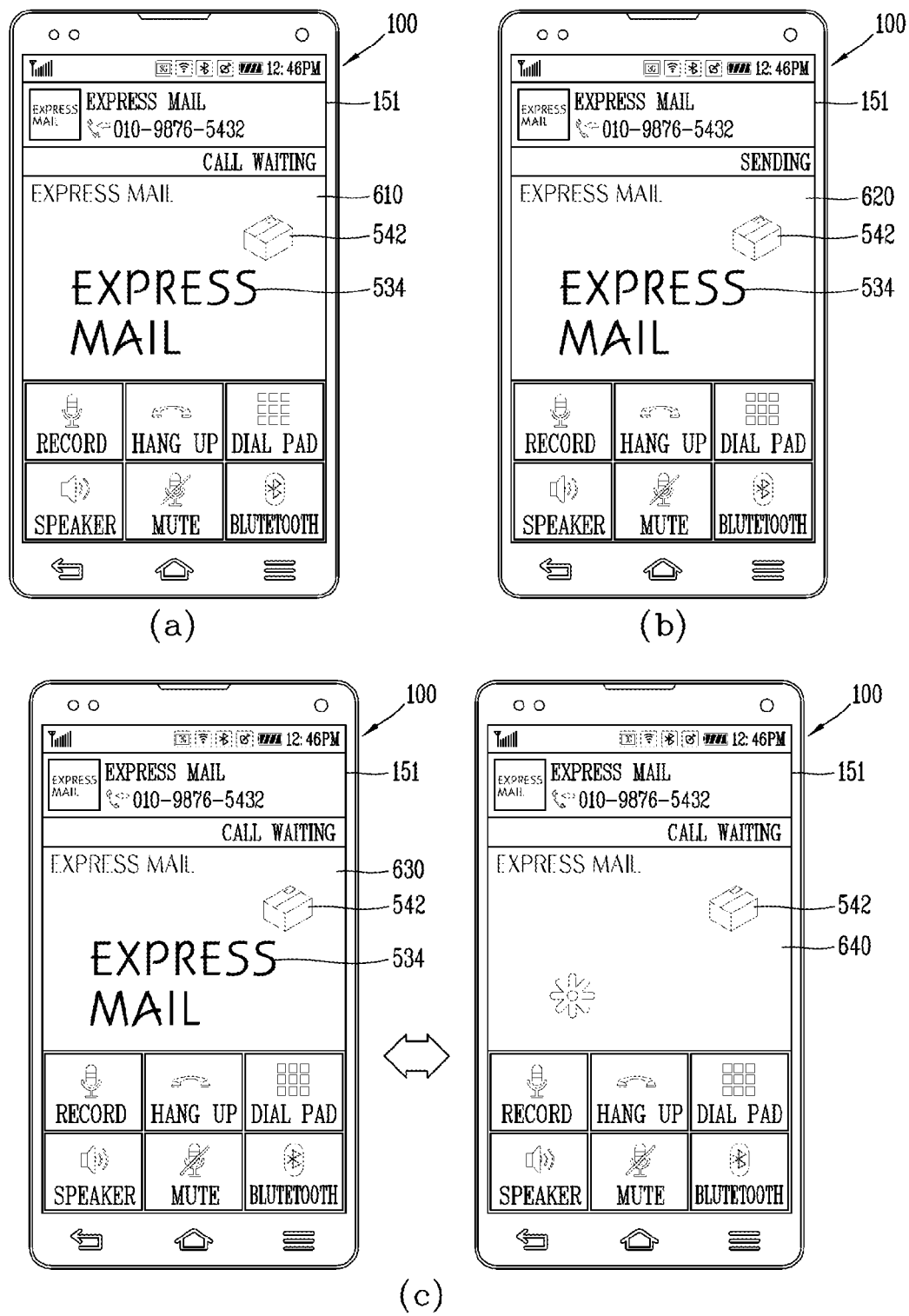
FIG. 6 is a conceptual view illustrating a user interface configured to display the content of memo in response to communication according to an embodiment.

FIG. 6 is a conceptual view illustrating a user interface configured to display the content of memo in response to communication according to an embodiment.

With reference to FIGS. 6A and 6B, for an incoming call's telephone number that has an entered memo, the content of a memo 610 may be displayed. In the same way, for an outgoing call's telephone number that has an entered memo, the content of the memo 620 may be displayed.

On the other hand, if a plurality of memos are stored for the telephone number, as shown in FIG. 5B and FIG. 5D, only the one memo that is selected among the plurality of memos may be displayed. Particularly, only the selected memo may be displayed, or the whole or a portion of the selected memo may be displayed.

With reference to FIG. 6C, for an incoming call's telephone number that has entered memos, as shown in FIG. 5, a plurality of the memos may be displayed for predetermined time periods until the incoming call is taken.

For instance, as illustrated in FIG. 6C, the content of the memo 630 (e.g., FIG. 5B) may be displayed for two seconds, and the content of the memo 640 (e.g., FIG. 5D) may then be displayed for two seconds; subsequently, the content of the memo 630 may again be displayed for two seconds. Like such manner, the content of memo 630 and the content of the memo 640 may be displayed alternatively, each of which is to be displayed for two seconds.

Figure 7:
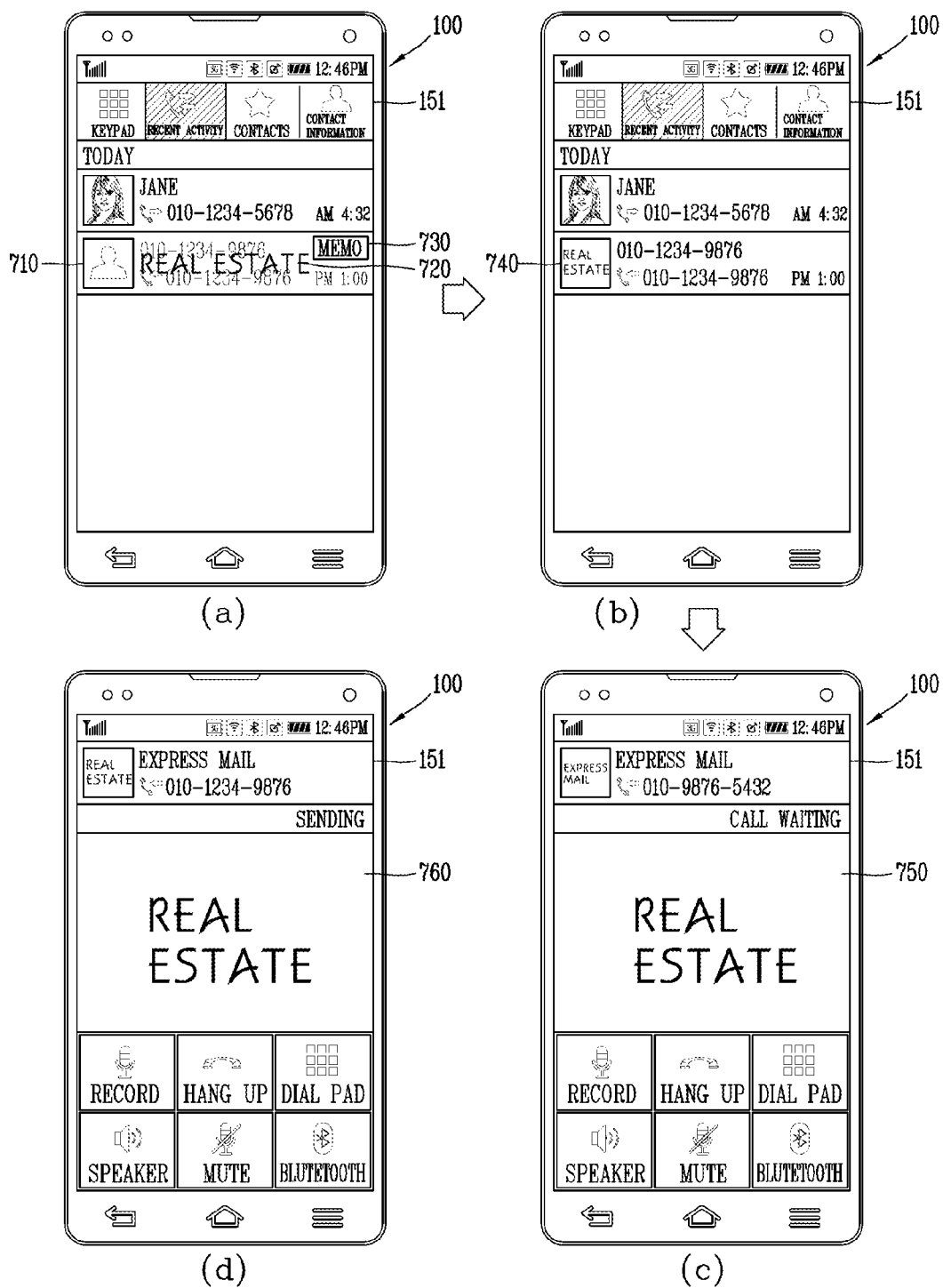
FIG. 7 is a conceptual view illustrating a user interface configured to enter the content of memo according to another embodiment.

FIG. 7 is a conceptual view illustrating a user interface configured to enter the content of memo according to another embodiment.

With reference to FIG. 7A, the content of a memo 720 may be directly entered into a record 710 of a recent communication with a telephone number that is not stored in the address book. Specifically, when the content of the memo is directly entered into the record 710 of the recent communication with a telephone number that is not stored in the address book, the content of memo 720 may be stored in the same way as the saving the content of memo 720 through the memo input mode.

As another embodiment, after touching the "memo" icon 730 that activates the memo input mode, a user may directly enter the content of a memo that the user desired to write down on the record 710 of a communication with the telephone number.

With reference to FIG. 7B, the content of memo 720 in FIG. 7A may be displayed as a form of a thumbnail 740 associated with the telephone number on a record of recent communication.

With reference to FIG. 7C and FIG. 7D, for the incoming call's telephone number that has an entered memo, the entered content 750 may be displayed. In the same way, for the outgoing call's telephone number that has an entered memo, the entered content 760 may be displayed.

On the other hand, at least one record of previous communication with the telephone number in response to a communication with the telephone number may be displayed.

Figure 8:
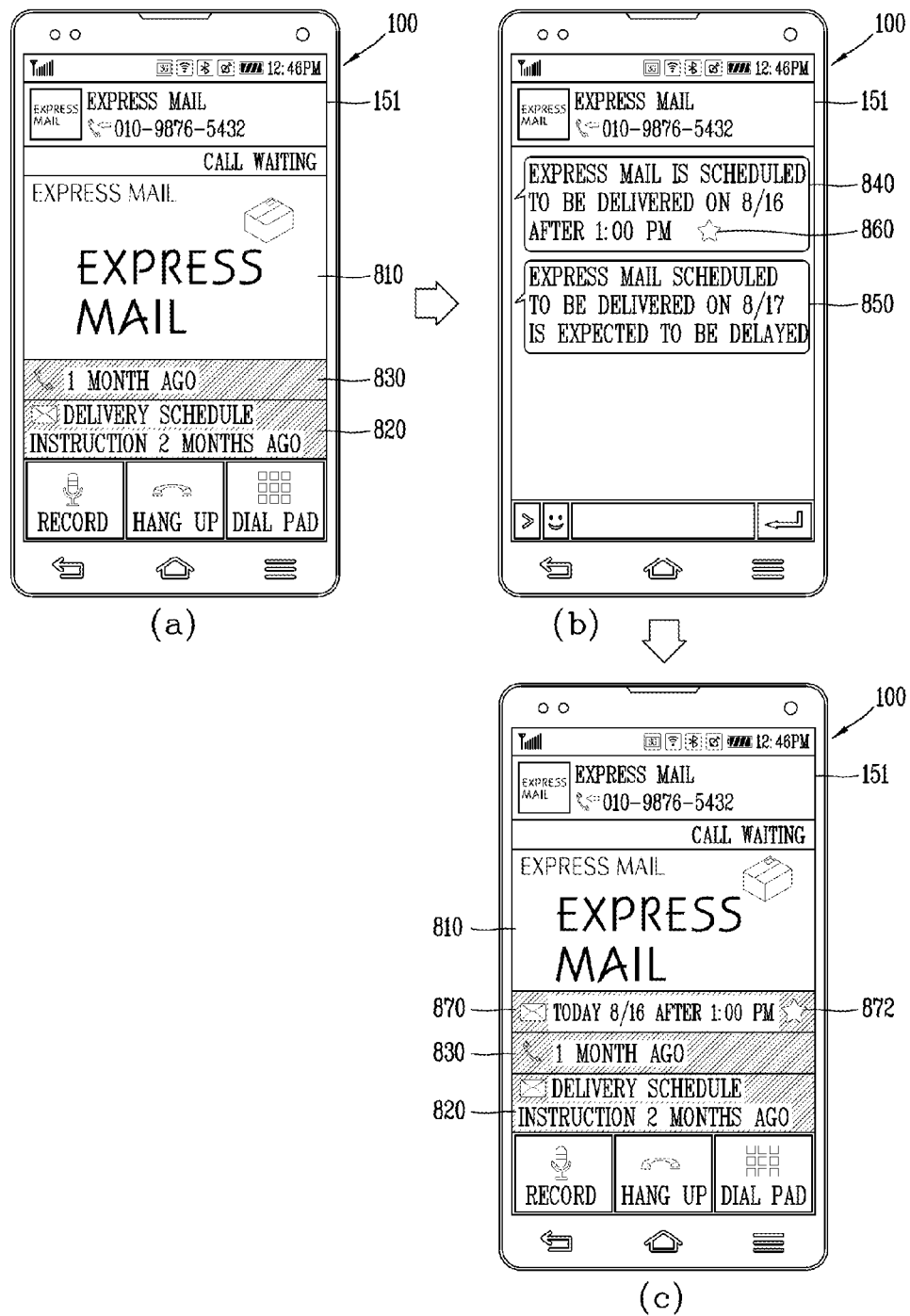
FIG. 8 is a conceptual view illustrating a user interface configured to display a record of previous communication according to an embodiment.

FIG. 8 is a conceptual view illustrating of a user interface configured to display a record of previous communication according to an embodiment.

With reference to FIG. 8A, for the incoming call's telephone number that has an entered memo shown in FIG. 5, the entered content 810, along with records 820, 830 indicating previous telephone calls or text messages with the telephone number, may be displayed in time order.

The records 820, 830 may be displayed either just below the content of the memo 810, or they may be overlapped with the content of the memo 810 while being displayed on an independent layer.

With reference to FIG. 8B, a user may select the important message 840 while using messages or telephone numbers that have memos the user has entered. More precisely, among the received messages 840, 850, when a message 840 is selected as an important message, an icon 860 for alerting the importance may be displayed on the message 840.

With reference to FIG. 8C, for the incoming call's telephone number that has an entered memo shown in FIG. 5, the entered content 810, along with records 820, 830, 870 indicating previous telephone calls or text messages with the telephone number, may be displayed.

In this regard, the message 870 classified as important may be distinguished from other messages 820, 830. As an exemplary embodiment, the important message may be either displayed above the other messages or displayed with the indicative icon 872 for alerting the importance.

According to another embodiment, the important message may be displayed with a unique visual image. For instance, the text in the important message may be written in bold, the whole or certain portions of the text may be enlarged, or the text with a noticeable color may be displayed.

On the other hand, a server may be installed such that it may sort and analyze a plurality of memos transmitted from a plurality of terminals and then send the analyzed outputs to the terminals respectively.

Specifically, the server may be configured to receive memos transmitted from the plurality of servers and then sort and gather the memos in predetermined ways. For instance, in response to the telephone number, the server may detect texts or sticker entered by each of terminals and then count each number of the text and the sticker respectively.

Subsequently, for the incoming call's telephone number that is not stored in the address book, the server's analyzed data 910 associated to the telephone number may be displayed.

Figure 9:
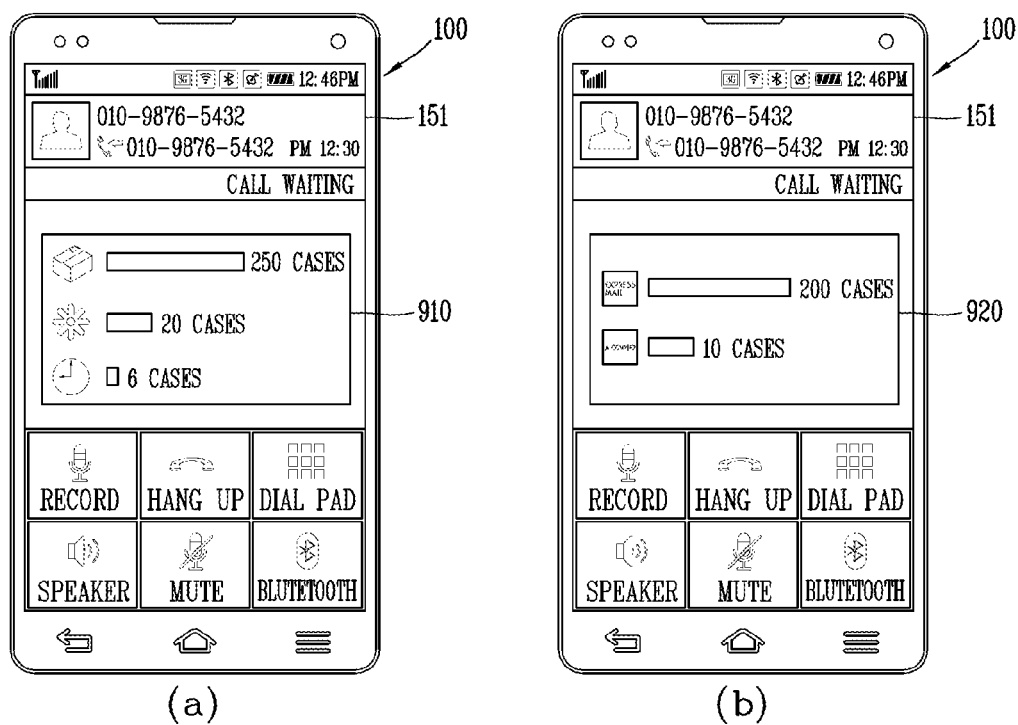
FIG. 9 is a conceptual view illustrating a user interface configured to display the details of data transmitted from a server according to an embodiment.

FIG. 9 is a conceptual view illustrating of a user interface configured to display the details of data transmitted from a server according to an embodiment.

With reference to FIG. 9A, as regards the telephone number, the display screen shows three groups of cases, each of which is labeled with a different sticker: the first group has 250 cases labeled with the express mailer sticker; the second group has 20 cases labeled with a flower sticker; and, the third group has 6 cases labeled with a clock sticker.

With reference to FIG. 9B, as regards the telephone number, the display screen shows two groups of cases labeled by different stickers: the first group has 200 cases labeled with a text written as "express" and the second group has 10 cases labeled with a text written as "driver."

On the other hand, at least one memo among a plurality of memos entered for each of a plurality of telephone numbers that are not available in the address may be displayed.

Figure 10:
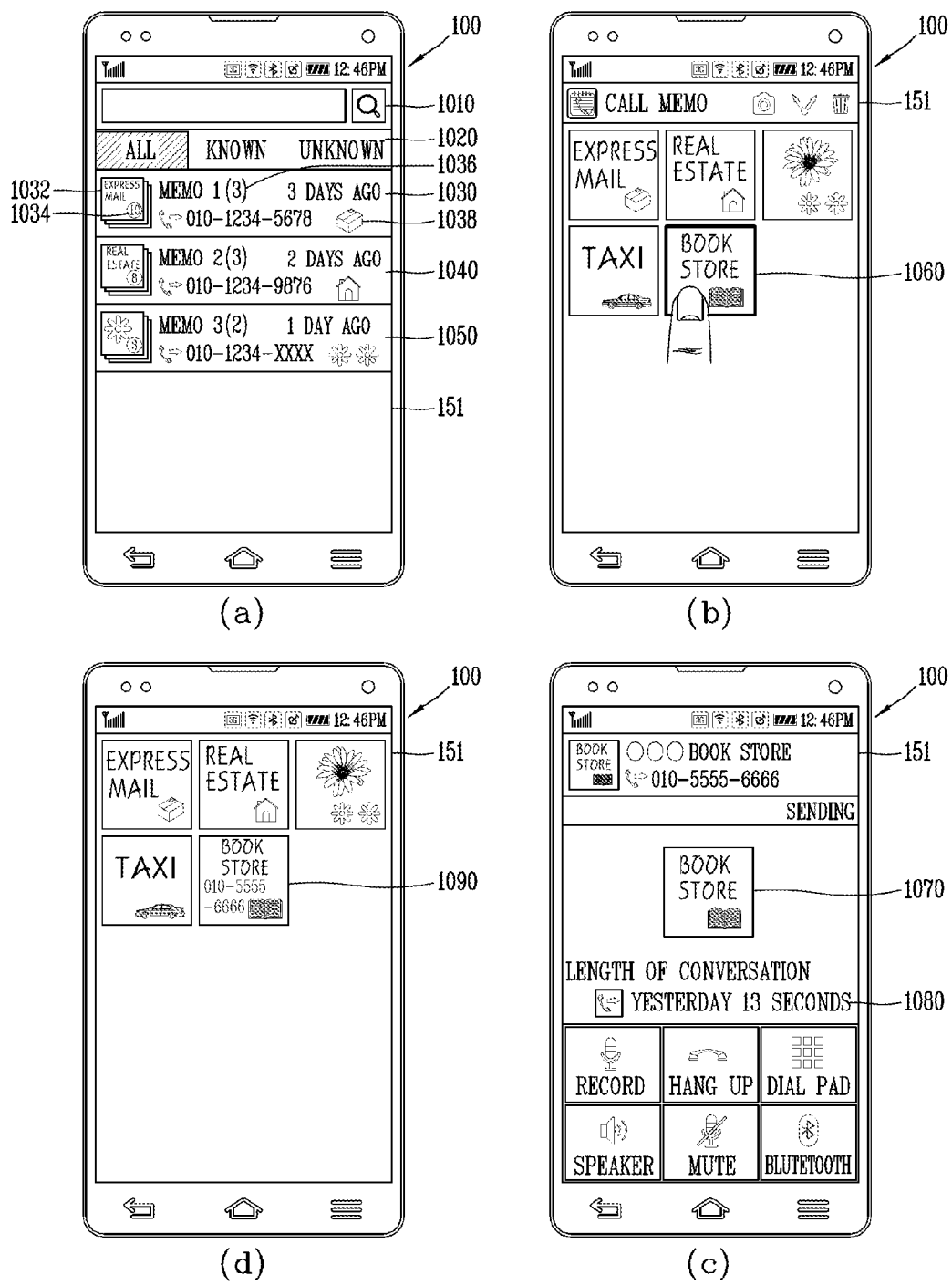
FIG. 10 is a conceptual view illustrating a user interface configured to display memos responsive to their corresponding telephone numbers according an embodiment.

FIG. 10 is a conceptual view illustrating of a user interface configured to display memos responsive to their corresponding telephone numbers according an embodiment.

With reference to FIG. 10A, on a user interface displaying telephone numbers saved in a memory unit and their associated memos, a search bar 1010 configured to find a memo may be displayed. Particularly, a desired memo can be found by entering key words (e.g., text entered as the content of memo, an attached icon, the telephone number used for communication or for a text message, the number of memo, etc.) into the search bar 1010.

Also, a category list 1020 classifying the telephone numbers and their associated memos stored in the memory unit may be displayed.

As one embodiment, "ALL" in the category list is configured to show all of the telephone numbers, along with their associated memos, stored in the memory unit.

On the other hand, according to another embodiment, the memo associated with a telephone number stored in the address book may be entered. Also, a telephone number containing an entered memo as well as the content of the memo may be stored in the address book.

Accordingly, "Known" in the category list is configured to show telephone numbers that are stored in the address book of the terminal 100 and "Unknown" in the category list is configured to show telephone numbers that are not stored in the address book of the terminal 100. In this regard, the details of this are set forth in the description below.

Also, a plurality of memos may be sorted by an input number and then displayed as shown in 1030, 1040, 1050. In this regard, for indicating the existence of the plurality of memos, the thumbnail 1032 may display the image of overlapped memos. As one exemplary embodiment, the most recent content of memo entered may be displayed at the upper left side of the thumbnail 1032. Also, the content of memo a user has selected may be displayed as a representative content of memo image.

As an exemplary embodiment, the number 1034 of telephone conversations or text messages with the telephone number may be displayed in the thumbnail 1032. Also, the number 1036 of memo entered and sicker 1038 attached to the memo may be displayed.

With reference to FIG. 10B, the figure shows a plurality of memos are displayed by the input number, and herein, thumbnails reflecting the content of the each memo may be displayed. As an exemplary embodiment, when a plurality of the contents of memos associated with a telephone number are stored, the content of the memo a user has nominated or the most recent content of memo entered may be displayed as a representative content of memo image.

Also, if a user selects and touches one thumbnail 1060, its associated telephone number may be dialed.

With reference to FIG. 10C, the telephone number corresponding to the touched thumbnail 1060 may be dialed, and the record 1080 showing previous communication 1080 with the representative memo image 1070 may be displayed.

With reference to FIG. 10D, a user may edit the content of memo in the manner of deleting, modifying, attaching, etc. As an exemplary embodiment, a user may additionally load a telephone number 1090 into the content of memo entered, either by his or her finger or by using a touch pen. Also, a key pad may be available for this additional loading.

The user interface to display memos may be accessed using a prescribed button, command, event, or the like. Moreover, in certain embodiments, the features disclosed with reference to FIG. 10 may also be incorporated into the list of recent communication records (e.g., call/message log) of FIG. 5.

As earlier described, at least one memo among a plurality of memos that are associated with telephone numbers not stored in the address book of a mobile terminal 100 may be displayed.

Figure 11:
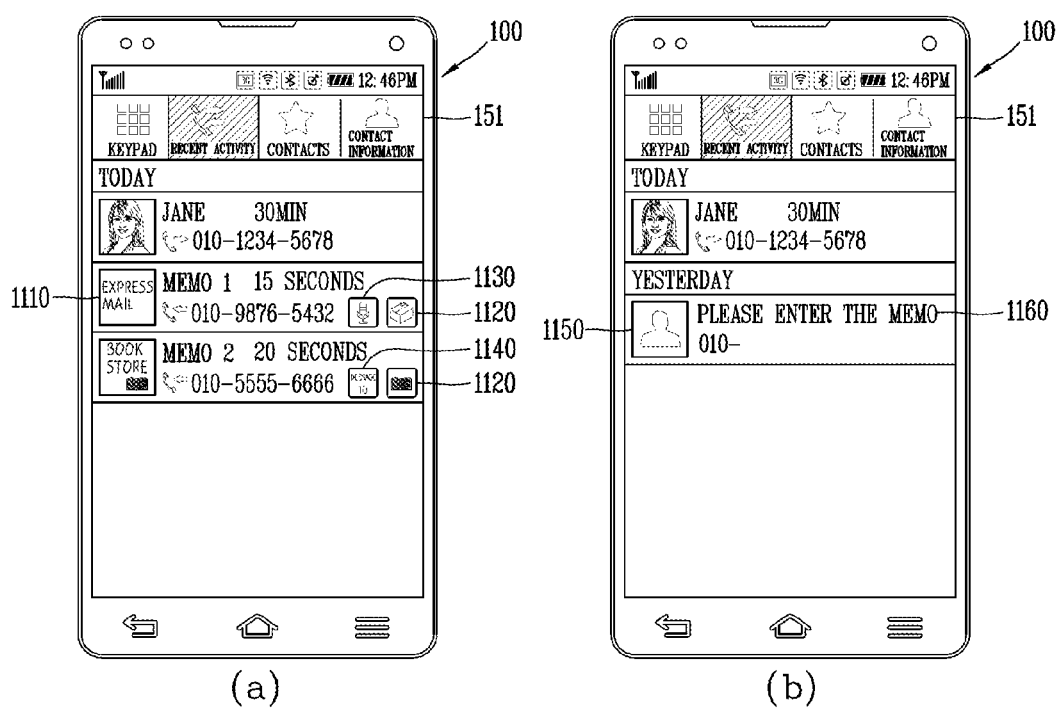
FIG. 11 is a conceptual view illustrating a user interface configured to display the content of the memo on a record of communication according to an embodiment.

FIG. 11 is a conceptual view illustrating a user interface configured to display the content of the memo on a record of communication according to an embodiment.

With reference to FIG. 11A, the content of memos stored in the memory unit is displayed on the recent call records. Specifically, the content of memo 1110 and an attached icon 1120 may be displayed. Also, if the voice in telephone conversation is recorded, a recoding icon 1130 may be displayed.

As another embodiment, the icons related with previous communications may be displayed. In particular, the numbers of telephone calls and/or text message with their corresponding telephone number may be displayed. Regarding this, FIG. 11A shows the icon 1140 indicating that the number of the total text messages exchanged with the telephone number amounts to 10.

As another embodiment, if more than one content of a memo associated with a telephone number is entered, either the content of a memo most recently entered or the content of a memo that a user has selected may be displayed.

With reference to FIG. 11B, a record of communication that does not contain any memo may be displayed with a different icon. For instance, an icon or thumbnail 1150 such as a vacant picture or a question symbol 1150, and/or a request 1160 for input command may be displayed.

As previously described, the content of memo associated with a telephone number may be edited, and a group of different memos associated with the telephone number may be entered.

FIG. 12 is a conceptual view illustrating of a user interface configured to display a plurality of memos associated with a phone number according to an embodiment.

With reference to FIG. 12A, in the memo output mode, when a user touches the thumbnail 1210 with a representative content of memo image, the contents of the plurality of memos 1220 that were entered for their telephone number may be displayed.

As one embodiment, a user may pick the one content 1220 among the plurality of content of a memo and then edit the one content by updating, deleting or adding new information.

As another embodiment, a new memo associated with a telephone number may be added by using an icon 1230 that enables additional memo input.

With reference to FIG. 12B, in the recent record of communication, when a user touches a thumbnail 1240 with a representative content of memo image, a plurality of memos 1250 associated with a telephone number may be displayed In the same way, a user may select one content from the plurality of memos 1250 that are associated with a telephone number and then edit the one content of memo by modifying, deleting, or updating. Also, a new number may be additionally entered into the telephone number by using the icon 1260 that is configured to enable adding a new memo.

On the other hand, the memo stored in the memory unit may also be stored in the address book according to an input of a control command for storing the memo in the address book. Herein, the memo may be separately stored in the address book according to the control command.

Specifically, the memory unit may be a different set of data holding place distinguishable from the address book of a mobile terminal 100. As an exemplary embodiment, a back up memory or a supplementary address book that plays as a local memory may be nominated for the memory unit.

As another exemplary embodiment, unlike most address books in mobile terminals, the memory unit may not automatically be linked to other messenger in computing system, such as SNS.

As another exemplary embodiment, the content of memo stored in the memory unit may automatically be stored to the address book. This saving in the address book, otherwise, may be implemented through additional commands.

On the other hand, when the telephone numbers stored in the address book fail to meet predetermined conditions they may be transferred to the memory unit.

As one exemplary embodiment, if the telephone numbers stored in address book fails to be in use for certain number of time within a given period of time they may be transferred to the memory unit.

Figure 13:
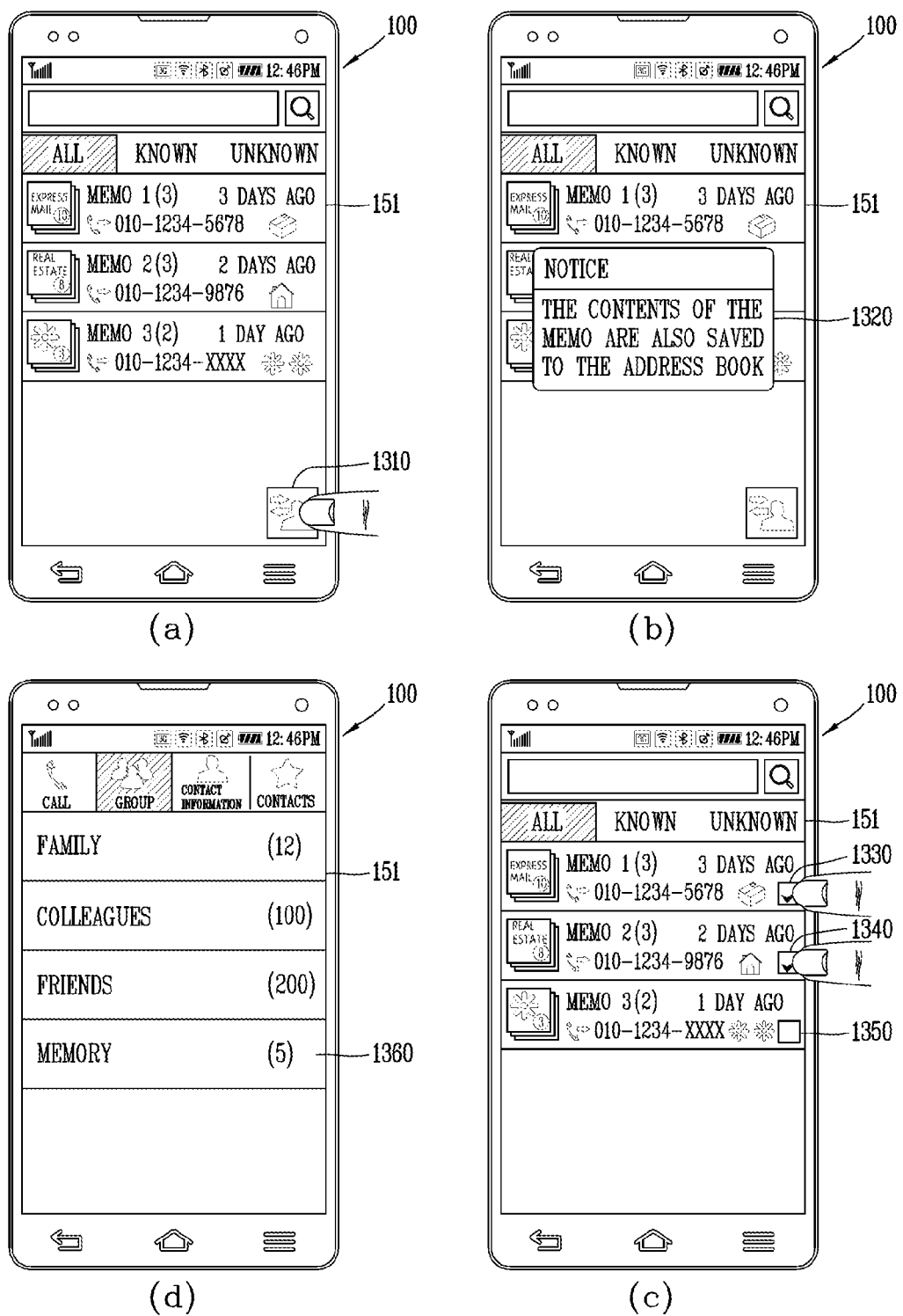
FIG. 13 is a conceptual view illustrating the interactions between a memory unit and an address book of a mobile terminal according to an embodiment.

FIG. 13 is an overview of a user interface illustrating the interactions between a memory unit and an address book of a mobile terminal according to an embodiment.

With reference to FIG. 13A, in the memo output mode, an icon 1310 is configured to store a plurality of telephone numbers along with the contents of memos, both of which are stored in the memory unit, in the address book in the mobile terminal 100.

FIG. 13B shows that the saving into the address book may be performed by touching the icon 1310 and a pop-up window 1320 may be displayed to confirm this saving.

With reference to FIG. 13C, in the memo output mode, check-up boxes 1330, 1340, 1350 in accordance with telephone numbers may be displayed. Among those check-up boxes, once check-boxes 1330, 1340 become checked, their relevant information, including the content of their memos, may be stored in the address book in the mobile terminal 100.

With reference to FIG. 13D, both telephone numbers and their associated content of memos stored in the memory unit may be stored as a different group 1360 in the address book.

Figure 14:
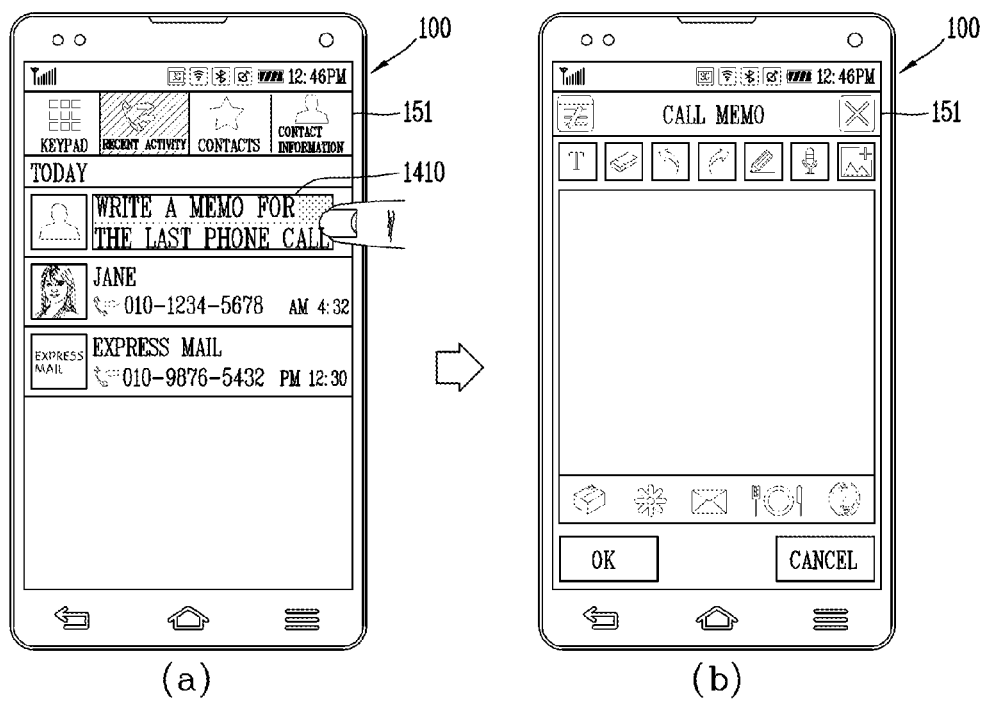
FIG. 14 is a conceptual view illustrating a user interface configured to enter the content of a memo subsequent to a telephone communication according to an embodiment.

FIG. 14 is an overview of a user interface configured to enter the content of a memo subsequent to a telephone communication according to an embodiment.

With reference to FIG. 14, an icon 1410 configured to activate the memo input mode according to a user's touch input may be displayed immediately after communication with a telephone numbers that is not stored in an address book of a mobile terminal.

As one embodiment, like utilizing the input method with dragging one of icons listed on a menu bar (although this dragging method is not applied here), the display screen containing a previous memo icon 1410 may automatically be unfolded from the top to bottom of the display screen.

As another embodiment, the previous memo icon 1410 configured to activate immediate memo input mode may be displayed in pop-up window immediately after the communication.

Accordingly, the immediate memo input mode may be activated by touching the previous memo icon 1410. Regarding the following process of entering the content of memo as well as follow-up editing are similar with the description that is previously stated.

According to one embodiment, telephone numbers and their associated information may be stored in a memory unit as separate data storage from the address book. In this regard, the information may be entered in a way of writing a memo, so the entering relevant content into the memo may be implemented much more conveniently.

In addition, among telephone numbers stored in the memory unit, only selected telephone numbers may be stored in the messenger or the address book. Hence, protecting personal privacy from unfiltered social networking services may be pursued while decreasing a risk of unwanted personal information exposures.

Consequently, due to this invention, improved user convenience is foreseeable.

According to an exemplary embodiment, the methods described above may be implemented as codes readable by a processor on a medium written by a program. Examples of the processor-readable media may include ROM, RAM, CD-ROM, magnetic tape, floppy disk, and optical data storage device, and the like, and also include a device implemented in the form of a carrier wave (for example, transmission via the internet).

The configurations and methods according to the above-described embodiments will not be applicable in a limited way to the foregoing mobile terminal, and all or part of each embodiment may be selectively combined and configured to make various modifications thereto.

One aspect of the detailed description is to improve a user's convenience by providing a mobile terminal device and methods for saving phone numbers, along with their associated information, in a memory unit that is separately located from address book of a mobile terminal.

A mobile terminal according to one embodiment may include a display configured to display a user interface that includes a log of communications from prescribed senders and a controller that controls display of information associated with the prescribed senders. The log may include a first record associated with a contact in an address book and a second record that is not associated with a contact in the address book. When the second record that is not associated with a contact is selected in the user interface, the user interface may be controlled to receive information associated with a sender of the second record, the received information being stored separately from the address book, and when a subsequent communication is received from the sender of the second record, the controller may display the received information on the display.

A mobile terminal according to one embodiment may include a display unit configured to display a record of communication with a telephone number that is not available in an address book of the mobile terminal; and a controller configured to activate a memo input mode to enter a memo associated with the telephone number when the record is selected, store a memo entered in association with the telephone number separately from the address book when the memo is entered through the memo input mode, wherein the controller controls the display unit to display the entered memo associated with the telephone number in response to a communication with the telephone number.

According to one embodiment, the controller may display an icon to activate the memo input mode responsive to a touch input subsequent to a communication with a telephone number that is not available in the address book of the mobile terminal.

According to one embodiment, the controller may edit the entered memo according to an input thereof or to store at least one memo that is additionally entered and is associated with the telephone number separately from the address book.

According to one embodiment, the controller may display a portion of at least one entered memo associated with the telephone number in response to a communication with the telephone number.

According to one embodiment, the controller may display at least one record of previous communication with the telephone number in response to a communication with the telephone number.

According to one embodiment, controller may store the memo in the address book according to an input of a control command for storing the memo in the address book.

According to one embodiment, the controller may store the memo as a separate group in the address book according to the input of control command.

According to one embodiment, the controller may store the memo in a memory unit separated from the address book when the memo is entered through the memo input mode and to transfer a telephone number stored in the address book to the memory unit if the telephone number fails to meet predetermined conditions.

According to one embodiment, the controller may display at least one entered memo associated with the telephone number on a list of telephone communications.

According to one embodiment, the controller may display at least one memo among a plurality of memos entered for each of a plurality of telephone numbers that are not available in the address.

A control method of a mobile terminal according to one embodiment of the present disclosure may include (a) displaying a record of communications with a telephone number that is not available in an address book of the mobile terminal; (b) activating a memo input mode to enter a memo associated with the telephone number when the record is selected; (c) storing a memo entered in association with the telephone number separately from the address book when the memo is entered through the memo input mode, wherein the step (c) includes displaying the entered memo associated with the telephone number in response to a communication with the telephone number.

According to one embodiment, the step (b) may include displaying an icon to activate the memo input memo responsive to touch input subsequent to a communication with a telephone number that is not available in the address book of the terminal.

According to one embodiment, the step (c) may include editing the entered memo according to an input thereof or storing at least one memo that is additionally entered and is associated with the telephone number separately from the address book.

According to one embodiment, the step (c) may include displaying a portion of at least one entered memo associated with the telephone number in response to a communication with the telephone number.

According to one embodiment, the step (c) may include displaying at least one record of previous communication with the telephone number in response to a communication with the telephone number.

According to one embodiment, the step (c) may include storing the memo in the address book according to an input of a control command for storing the memo in the address book.

According to one embodiment, the step (c) may include storing the memo as a separate group in the address book according to the input of control command.

According to one embodiment, the step (c) may include storing the memo in a memory unit separated from the address book when the memo is entered through the memo input mode and transferring a telephone number stored in the address book to the memory unit if the telephone number fails to meet predetermined conditions.

According to one embodiment, the step (c) may include displaying at least one entered memo associated with the telephone number on a list of telephone communications.

According to one embodiment, the step (c) may include displaying at least one memo among a plurality of memos entered for each of a plurality of telephone numbers that are not available in the address.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal, comprising:
    a display configured to display a record of communications with a telephone number that is not available in an address book of the mobile terminal; and
    a controller configured to activate a memo input mode to enter a memo associated with the telephone number when the record is selected, store a memo entered in association with the telephone number in a memory that is separate from the address book and is not automatically linked to a messenger application when the memo is entered through the memo input mode, and display the stored memo associated with the telephone number and analyzed data from a server in response to a communication with the telephone number, and
    wherein the server sorts and analyzes a plurality of memos associated with the telephone number transmitted from a plurality of terminals and then sends the analyzed data to the plurality of terminals, wherein the controller stores a plurality of memos in the memory separately from the address book when the memos are entered in association with the telephone number through the memo input mode, detects user input selecting at least one of the plurality of memos, and stores the selected memo in the address book, and wherein the controller controls the display to display the plurality of memos entered in association with the telephone number, for predetermined time periods alternatively, until an incoming call of the telephone number is taken.

2. The mobile terminal of claim 1, wherein the controller displays an icon to activate the memo input mode subsequent to the communication with the telephone number that is not available in the address book of the mobile terminal.

3. The mobile terminal of claim 1, wherein the controller edits the entered memo according to an input or stores at least one second memo that is associated with the telephone number separately from the address book.

4. The mobile terminal of claim 1, wherein the controller displays a portion of at least one entered memo associated with the telephone number when the communication with the telephone number is received.

5. The mobile terminal of claim 1, wherein the controller displays at least one record of a previous communication with the telephone number when the communication with the telephone number is received.

6. The mobile terminal of claim 1, wherein the controller stores the memo as a separate group in the address book according to a user input.

7. The mobile terminal of claim 1, wherein the controller transfers a telephone number stored in the address book to the memory when the telephone number fails to meet prescribed conditions.

8. The mobile terminal of claim 1, wherein the controller displays at least one entered memo associated with the telephone number in a list of telephone communications.

9. The mobile terminal of claim 1, wherein the controller displays at least one memo among a plurality of memos entered for each of a plurality of telephone numbers that are not available in the address book.

10. A method of controlling a mobile terminal, comprising:
 displaying a record of communications with a telephone number that is not available in an address book of the mobile terminal;
 activating a memo input mode to enter a memo associated with the telephone number when the record is selected;
 storing a memo entered in association with the telephone number in a memory that is separate from the address book and is not automatically linked to a messenger application when the memo is entered through the memo input mode,
 wherein the stored memo and analyzed data from a server are displayed in response to a subsequent communication with the telephone number; and
 wherein the server sorts and analyzes a plurality of memos associated with the telephone number transmitted from a plurality of terminals and then sends the analyzed data to the plurality of terminals,
 wherein activating the memo input mode includes storing a plurality of memos in the memory separately from the address book when the memos are entered in association with the telephone number through the memo input mode, detecting user input selecting at least one of the plurality of memos, and storing the selected memo in the address book; and
 displaying the plurality of memos entered in association with the telephone number, for predetermined time periods alternatively, until an incoming call of the telephone number is taken.

11. The method of claim 10, wherein activating the memo input mode includes displaying an icon to activate the memo input mode, the icon being displayed subsequent to communications with telephone numbers which are not available in the address book of the mobile terminal.

12. The method of claim 10, wherein storing the memo includes editing the entered memo according to an input or storing at least one second memo that is associated with the telephone number separately from the address book.

13. The method of claim 10, wherein displaying the stored memo includes displaying a portion of at least one entered memo associated with the telephone number when the communication with the telephone number is received.

14. The method of claim 10, wherein displaying the stored memo includes displaying at least one record of a previous communication with the telephone number when the communication with the telephone number is received.

15. The method of claim 10, wherein the memo is stored as a separate group in the address book according to a user input.

16. The method of claim 10, wherein storing the memo includes transferring a telephone number stored in the address book to the memory when the telephone number fails to meet prescribed conditions.

17. The method of claim 10, wherein at least one entered memo associated with the telephone number is displayed in a list of telephone communications or is displayed among a plurality of memos entered for each of a plurality of telephone numbers that are not available in the address.

18. A mobile terminal, comprising:
 a display configured to display a user interface that includes a log of communications from prescribed senders; and
 a controller that controls display of information associated with the prescribed senders,
 wherein the log includes a first record associated with a contact in an address book and a second record that is not associated with a contact in the address book,
 wherein, when the second record that is not associated with a contact is selected in the user interface, the user interface is controlled to receive information associated with a sender of the second record, the received information being stored in a memory that is separate from the address book and is not automatically linked to a messenger application, and when a communication is received from the sender of the second record, the controller displays the received information and analyzed data from a server on the display, and
 wherein the server sorts and analyzes a plurality of memos associated with the telephone number transmitted from a plurality of terminals and then sends the analyzed data to the plurality of terminals,
 wherein the controller stores a plurality of memos in the memory separately from the address book when the memos are entered in association with the telephone number through a memo input mode, detects user input selecting at least one of the plurality of memos, and stores the selected memo in the address book, and
 wherein the controller controls the display to display the plurality of memos, for predetermined time periods, alternatively until an incoming call of the telephone number is taken.

* * * * *